(12) United States Patent
Decker et al.

(10) Patent No.: US 10,037,216 B2
(45) Date of Patent: Jul. 31, 2018

(54) INTELLIGENT DISABLING OF BROWSER PLUGINS

(71) Applicant: Apple Inc., Cupertino, CA (US)

(72) Inventors: Kevin Decker, San Jose, CA (US); Conrad Shultz, San Jose, CA (US); Steven Falkenburg, Los Altos, CA (US); Darin Adler, Los Gatos, CA (US); Richard Mondello, Mountain View, CA (US); Craig M. Federighi, Los Altos Hills, CA (US); Patrick L. Coffman, San Francisco, CA (US); Jessie Berlin, San Jose, CA (US)

(73) Assignee: APPLE INC., Cupertino, CA (US)

( * ) Notice: Subject to any disclaimer, the term of this patent is extended or adjusted under 35 U.S.C. 154(b) by 275 days.

(21) Appl. No.: 14/864,770

(22) Filed: Sep. 24, 2015

(65) Prior Publication Data

US 2016/0357583 A1    Dec. 8, 2016

Related U.S. Application Data

(60) Provisional application No. 62/172,158, filed on Jun. 7, 2015.

(51) Int. Cl.
*G06F 9/00* (2006.01)
*G06F 1/24* (2006.01)
(Continued)

(52) U.S. Cl.
CPC ............ *G06F 9/44526* (2013.01); *G06F 8/62* (2013.01); *G06F 21/51* (2013.01)

(58) Field of Classification Search
None
See application file for complete search history.

(56) References Cited

U.S. PATENT DOCUMENTS 8,200,962 B1 *  6/2012  Boodman ............... G06F 21/53
                                                    713/161
8,539,050 B2 *  9/2013  Tow ......................... G06F 8/65
                                                    709/221
(Continued)

FOREIGN PATENT DOCUMENTS

EP         2784672 A1    10/2014
WO    2015/033333 A1     3/2015

OTHER PUBLICATIONS

International Search Report and Written Opinion received for PCT Patent Application No. PCT/US2015/065503, dated Mar. 2, 2016, 12 pages.

(Continued)

*Primary Examiner* — Nitin Patel
(74) *Attorney, Agent, or Firm* — Dentons US LLP

(57) ABSTRACT

Systems and methods for disabling one or more plugins associated with a browser application are provided. In one exemplary method, a plugin is installed on an electronic device, and the device receives data from a data source, where that data is associated with the installed plugin. Whether the installed plugin meets a disabling criteria is determined. In accordance with a determination that that the installed plugin meets a disabling criteria: performance of a function with the installed plugin is foregone; and it is reported to the data source that the installed plugin is not installed on the electronic device. In accordance with a determination that the installed plugin does not meet the disabling criteria, the function is performed with the installed plugin.

48 Claims, 17 Drawing Sheets

(51) Int. Cl.
*G06F 9/445* (2018.01)
*G06F 21/51* (2013.01)
*G06F 8/61* (2018.01)

(56) References Cited

U.S. PATENT DOCUMENTS

| | | | | |
|---|---|---|---|---|
| 8,863,112 | B2* | 10/2014 | Kumagai | G06F 8/67 |
| | | | | 709/201 |
| 8,935,755 | B1* | 1/2015 | Kay | G06F 8/61 |
| | | | | 726/1 |
| 2007/0130327 | A1* | 6/2007 | Kuo | G06F 17/3089 |
| | | | | 709/224 |
| 2013/0013954 | A1* | 1/2013 | Benedek | G06F 11/0709 |
| | | | | 714/3 |
| 2015/0128021 | A1 | 5/2015 | Hewett et al. | |
| 2015/0150128 | A1 | 5/2015 | Li | |
| 2015/0347618 | A1* | 12/2015 | Ogita | G06F 17/30905 |
| | | | | 715/234 |
| 2016/0277386 | A1* | 9/2016 | Boss | G06F 17/243 |

OTHER PUBLICATIONS

Swaney et al., "Dynamic Web File Format Transformations with Grace", 5th International Web Archiving Workshop and Digital Preservation (IWAW 05), Dec 16, 2005, 12 pages.

* cited by examiner

INTELLIGENT DISABLING OF BROWSER PLUGINS

CROSS-REFERENCE TO RELATED APPLICATIONS

This application claims priority to U.S. Provisional Patent Application No. 62/172,158, entitled "Intelligent Disabling of Browser Plugins," filed Jun. 7, 2015, the content of which is hereby incorporated by reference in its entirety for all purposes.

FIELD

The present disclosure relates generally to plugins, and more specifically to techniques for controlling one or more plugins under different circumstances.

BACKGROUND

Modern electronic devices allow users to be more connected than ever to people and to media. However, old techniques of delivering media to a stationary electronic device or a mobile electronic device persist, and can be burdensome or nonfunctional. For example, a browser application utilizes a plugin to play a particular type of media. Additionally, some websites or other data sources are capable of serving media information, such as video and/or audio data, to a browser application in several different formats.

BRIEF SUMMARY

Many plugins are, however, particularly vulnerable to malware attack. Therefore, a plugin that a user has used to watch a video can become infected by malware, slowing or harming the user's electronic device, and potentially exposing the user's personal information to the creator or user of that malware. Further, some plugins run inefficiently, causing the user to waste time waiting for the plugin to execute and contributing to decreased battery life in portable devices. Some plugins become unsupported over time, causing maintenance problems for a user who may not be trained in technical matters. Despite these problems, a user may not wish to uninstall the plugin, because particularly where the user uses that plugin frequently to play back media from a particular webpage or other data source. By allowing the plugin to remain on the electronic device, the user exposes himself or herself to risk. Some malware prevention software or services attempt to mitigate this risk by disabling a plugin without user intervention, when it has been determined that the plugin has been attacked by malware. However, this solution results in the user constantly being prompted to install the plugin.

Moreover, websites or data sources that are capable of serving media information (e.g., video and/or audio data) to a browser application in several different formats often do so preferentially in a particular format. If the data source queries the browser application, and receives information indicating that the plugin associated with the preferred format of video and/or audio data is present even though that plugin is disabled, then in some instances the data source does not serve video and/or audio data to the user in a different format. Instead, the data source requests (or insists) that the user enable the plugin associated with video and/or audio data in the preferred format. This occurs, for example, where a browser application has the capability of running video in HTML5 format directly without a plugin, and the data source is capable of serving both HTML5 video and video in another format that requires a plugin to be enabled in order to play back the content in the browser application.

Some techniques for disabling one or more plugins associated with a browser application using electronic devices, however, are generally cumbersome and inefficient. For example, existing techniques use a manual user interface, which in some embodiments includes multiple key presses or keystrokes. In some embodiments, the user has to locate and navigate to a preferences menu or other menu or screen, in order to manually activate or deactivate a plugin each time the user wishes to watch a video or listen to a song. Existing techniques require more time than necessary, wasting user time and device energy. This latter consideration is particularly important in battery-operated devices.

Accordingly, the present disclosure recognizes that existing techniques for controlling and using plugins may be particularly cumbersome and ineffective. Therefore, the present disclosure provides for electronic devices with faster, more efficient methods and interfaces for disabling one or more plugins associated with a browser application. Such methods and interfaces optionally complement or replace other methods for disabling one or more plugins associated with a browser application. Such methods and interfaces reduce the cognitive burden on a user and produce a more efficient human-machine interface. For all devices, the present disclosure provides for methods and interfaces that improve protection against malware, and provides for display of media in preferred formats that are less susceptible to malware or are otherwise preferable. For battery-operated computing devices, such methods and interfaces conserve power and increase the time between battery charges. Such methods and interfaces may also reduce the number of unnecessary, extraneous, repetitive, and/or redundant inputs, and may create a faster and more efficient user interface arrangement, which may reduce the number of required inputs, reduce processing power, and reduce the amount of time for which user interfaces need to be displayed in order for desired functions to be accessed and carried out.

In some embodiments, a method of disabling one or more plugins associated with a browser application includes: at an electronic device with a display: while a plugin is installed on the device, receiving first data from a data source, the first data associated with the installed plugin; in response to receiving the first data from the data source while the plugin is installed on the device, determining if the installed plugin meets a disabling criteria; in accordance with a determination that the installed plugin meets a disabling criteria: forgoing performance of a function with the installed plugin; and reporting to the data source that the installed plugin is not installed on the electronic device; in accordance with a determination that the installed plugin does not meet the disabling criteria, performing the function with the installed plugin.

In some embodiments, an electronic device includes: a display; a memory; a processor coupled to the display and the memory; and an installed plugin stored in the memory and executable by the processor; the processor configured to: receive first data from a data source, the first data associated with the installed plugin; in response to receipt of the first data from the data source, determining if the installed plugin meets a disabling criteria; in accordance with a determination that the installed plugin meets a disabling criteria: forgo performance of a function with the installed plugin; and report to the data source that the installed plugin is not installed on the electronic device; in accordance with a determination that the installed plugin does not meet the disabling criteria, perform the function with the installed plugin.

In some embodiments, a non-transitory computer-readable storage medium stores one or more programs, the one or more programs comprising instructions, which when executed by an electronic device, cause the electronic device to: while a plugin is installed on the device receive first data from a data source, the first data associated with the installed plugin; in response to receipt of the first data from the data source while the plugin is installed on the device, determining if the installed plugin meets a disabling criteria; in accordance with a determination that the installed plugin meets a disabling criteria: forgo performance of a function with the installed plugin; and report to the data source that the installed plugin is not installed on the electronic device; in accordance with a determination that the installed plugin does not meet the disabling criteria, perform the function with the installed plugin.

In some embodiments, a transitory computer-readable medium stores one or more programs, the one or more programs comprising instructions, which when executed by an electronic device, cause the electronic device to: while a plugin is installed on the device receive first data from a data source, the first data associated with the installed plugin; in response to receipt of the first data from the data source while the plugin is installed on the device, determining if the installed plugin meets a disabling criteria; in accordance with a determination that the installed plugin meets a disabling criteria: forgo performance of a function with the installed plugin; and report to the data source that the installed plugin is not installed on the electronic device; in accordance with a determination that the installed plugin does not meet the disabling criteria, perform the function with the installed plugin.

In some embodiments, a system utilizes an electronic device with a display, where the system includes: means, while a plugin is installed on the device, for receiving first data from a data source, the first data associated with the installed plugin; means, responsive to receiving the first data from the data source while the plugin is installed on the device, for determining if the installed plugin meets a disabling criteria; in accordance with a determination that the installed plugin meets a disabling criteria: forgoing performance of a function with the installed plugin; and reporting to the data source that the installed plugin is not installed on the electronic device; in accordance with a determination that the installed plugin does not meet the disabling criteria, performing the function with the installed plugin.

In some embodiments, an electronic device, includes: a processing unit that includes a determining unit, the processing unit configured to: enable, while a plugin is installed on the device, receiving first data from a data source, the first data associated with the installed plugin; determine using the determining unit, in response to receipt of the first data from the data source while the plugin is installed on the device, if the installed plugin meets a disabling criteria; in accordance with a determination that the installed plugin meets a disabling criteria: forgo performance of a function with the installed plugin; and report to the data source that the installed plugin is not installed on the electronic device; in accordance with a determination that the installed plugin does not meet the disabling criteria, perform the function with the installed plugin.

Thus, devices are provided with faster, more efficient methods and interfaces for disabling one or more plugins associated with a browser application, thereby increasing the effectiveness, efficiency, and user satisfaction with such devices. Such methods and interfaces complement or replace other methods for disabling one or more plugins associated with a browser application.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
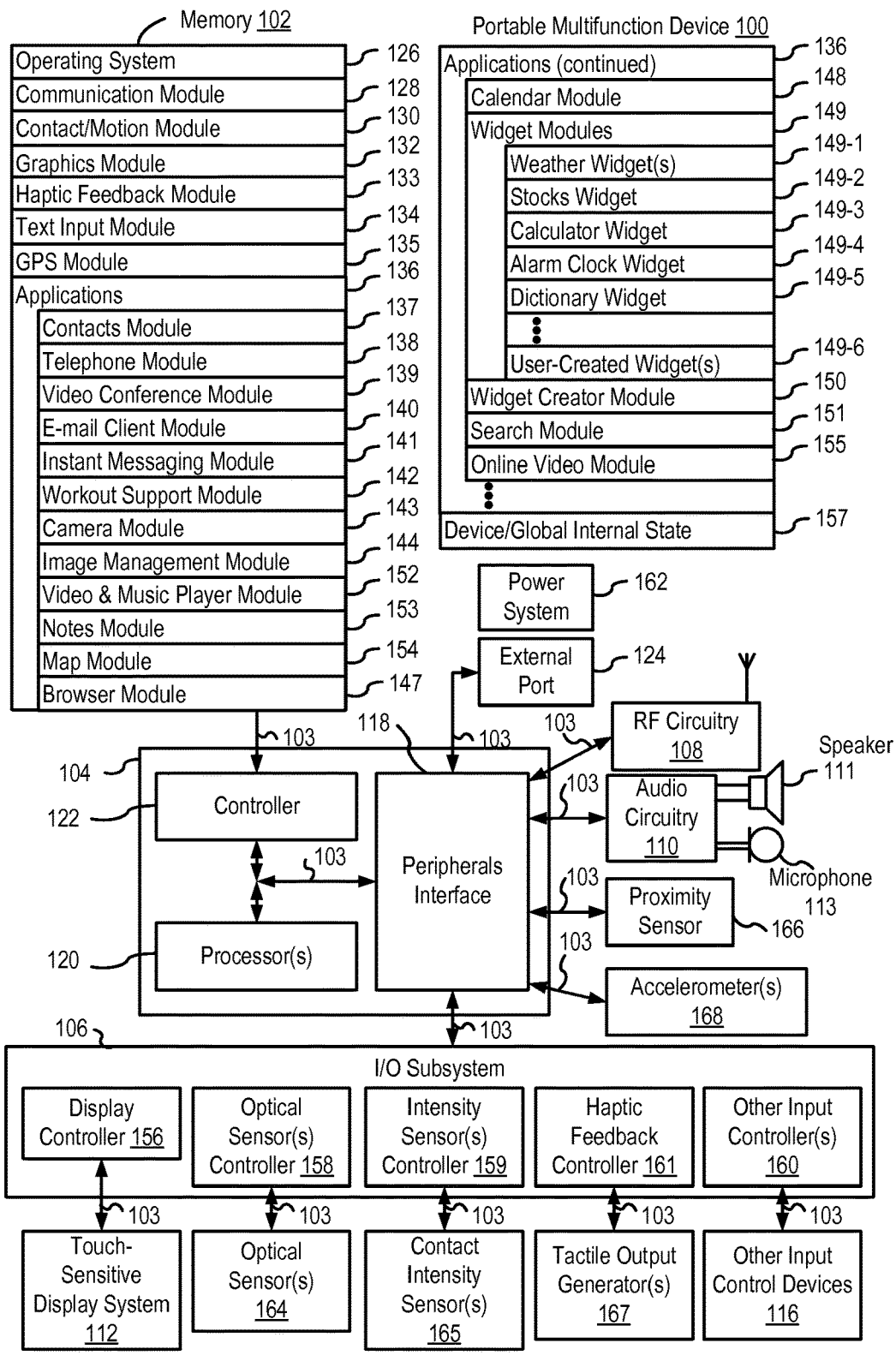
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

As noted above, the present disclosure provides for electronic devices with faster, more efficient methods and interfaces for disabling one or more plugins associated with a browser application, because the use of such plugins pose a malware risk to the user's electronic device or data. The present disclosure addresses this problem by reporting to a data source such as a website that a particular plugin is not installed, even when it is actually installed. Because many data sources serve media information in multiple formats (such as, for example, proprietary formats and HTML5), when it is reported to a data source that a particular plugin is not installed in a browser application (even though it is actually installed in the browser application), the data source will serve the media in a more favored format, such as HTML5, which can be experienced by a user.

Below, FIGS. 1A-1B, 2, 3, 4A-4B, and 5A-5B provide a description of exemplary devices for performing the techniques for disabling one or more plugins associated with a browser application. FIGS. 6A-6B illustrate exemplary user interfaces for disabling one or more plugins associated with a browser application. FIGS. 7A-7D are flow diagrams illustrating methods of disabling one or more plugins associated with a browser application in accordance with some embodiments. The user interfaces in FIGS. 6A-6B are used to illustrate the processes described below, including the processes in FIGS. 7A-7D.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device optionally supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally can include one or more computer-readable storage mediums. The computer-readable storage mediums optionally can be tangible and non-transitory. Memory 102 optionally can include high-speed random access memory and also optionally can include non-volatile memory, such as one or more magnetic disk storage devices, flash memory devices, or other non-volatile solid-state memory devices. Memory controller 122 optionally can control access to memory 102 by other components of device 100. Executable instructions for performing these functions are, optionally, included in a transitory computer-readable storage medium or other computer program product configured for execution by one or more processors.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 optionally can be implemented on a single chip, such as chip 104. In some other embodiments, they optionally can be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data optionally can be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally can disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally can turn power to device 100 on or off. The user optionally can be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally can include graphics, text, icons, video, and any combination thereof (collectively termed "graphics"). In some embodiments, some or all of the visual output optionally can correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally can use LCD (liquid crystal display) technology, LPD (light emitting polymer display) technology, or LED (light emitting diode) technology, although other display technologies optionally can be used in other embodiments. Touch screen 112 and display controller 156 optionally can detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 optionally can be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 optionally can be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user optionally can make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally can include a touchpad (not shown) for activating or deactivating particular functions. In some embodiments, the touchpad is a touch-sensitive area of the device that, unlike the touch screen, does not display visual output. The touchpad optionally can be a touch-sensitive surface that is separate from touch screen 112 or an extension of the touch-sensitive surface formed by the touch screen.

Device 100 also includes power system 162 for powering the various components. Power system 162 optionally can include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 also optionally can include one or more optical sensors 164. FIG. 1A shows an optical sensor coupled to optical sensor controller 158 in I/O subsystem 106. Optical sensor 164 optionally can include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally can capture still images or video. In some embodiments, an optical sensor is located on the back of device 100, opposite touch screen display 112 on the front of the device so that the touch screen display optionally can be used as a viewfinder for still and/or video image acquisition. In some embodiments, an optical sensor is located on the front of the device so that the user's image optionally can be obtained for video conferencing while the user views the other video conference participants on the touch screen display. In some embodiments, the position of optical sensor 164 can be changed by the user (e.g., by rotating the lens and the sensor in the device housing) so that a single optical sensor 164 optionally can be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 also optionally can include one or more proximity sensors 166. FIG. 1A shows proximity sensor 166 coupled to peripherals interface 118. Alternately, proximity sensor 166 optionally can be coupled to input controller 160 in I/O subsystem 106. Proximity sensor 166 optionally can perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 also optionally can include one or more accelerometers 168. FIG. 1A shows accelerometer 168 coupled to peripherals interface 118. Alternately, accelerometer 168 optionally can be coupled to an input controller 160 in I/O subsystem 106. Accelerometer 168 optionally can perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
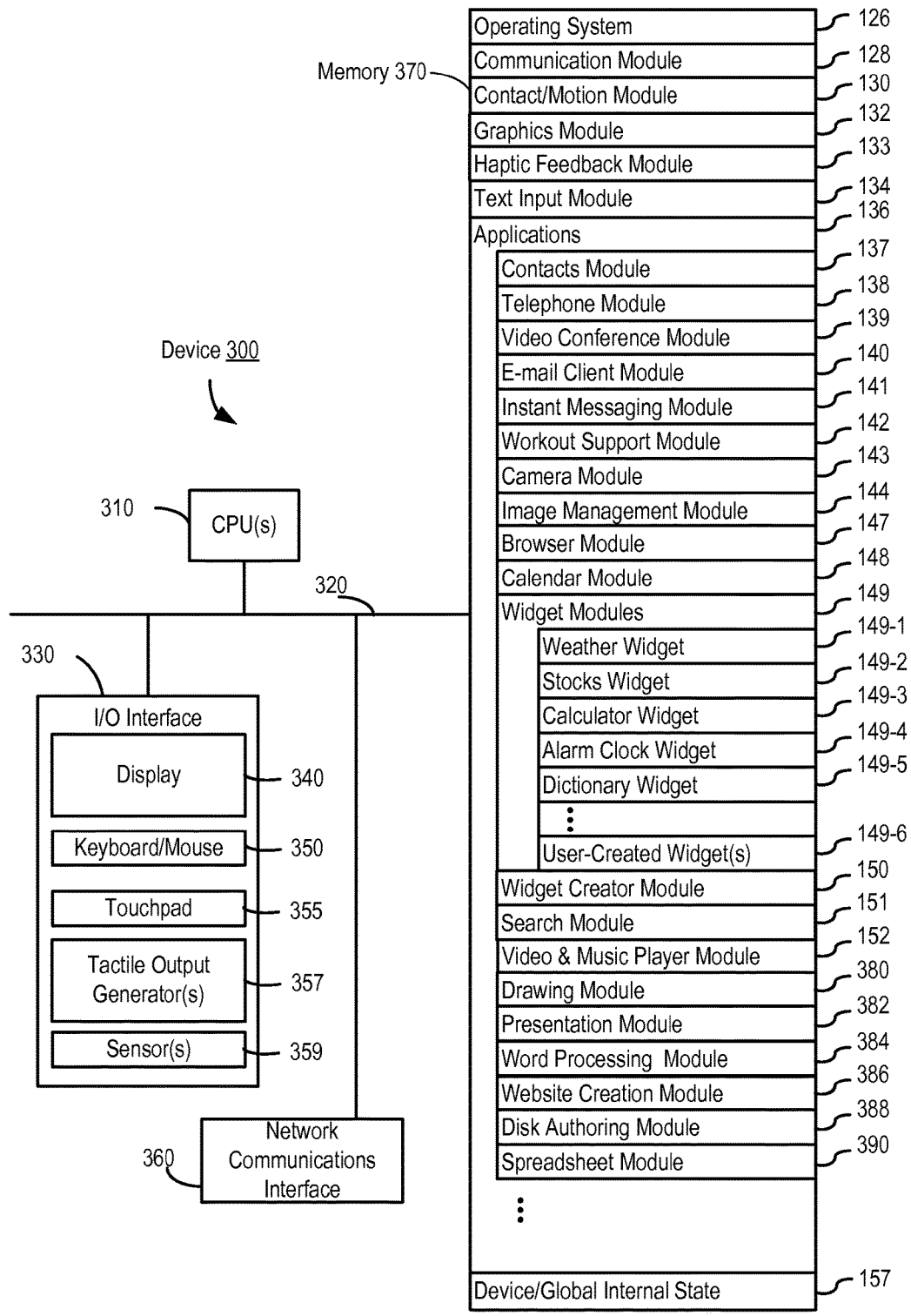
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which optionally can be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally can include the following modules (or sets of instructions), or a subset or superset thereof:

Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally can include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that optionally can be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 optionally can be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 optionally can be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally can use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally can include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that optionally can be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 optionally can be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 optionally can be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules optionally can be combined or otherwise rearranged in various embodiments. For example, video player module optionally can be combined with music player module into a single module (e.g., video and music player module 152, FIG. 1A). In some embodiments, memory 102 optionally can store a subset of the modules and data structures identified above. Furthermore, memory 102 optionally can store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 optionally can be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
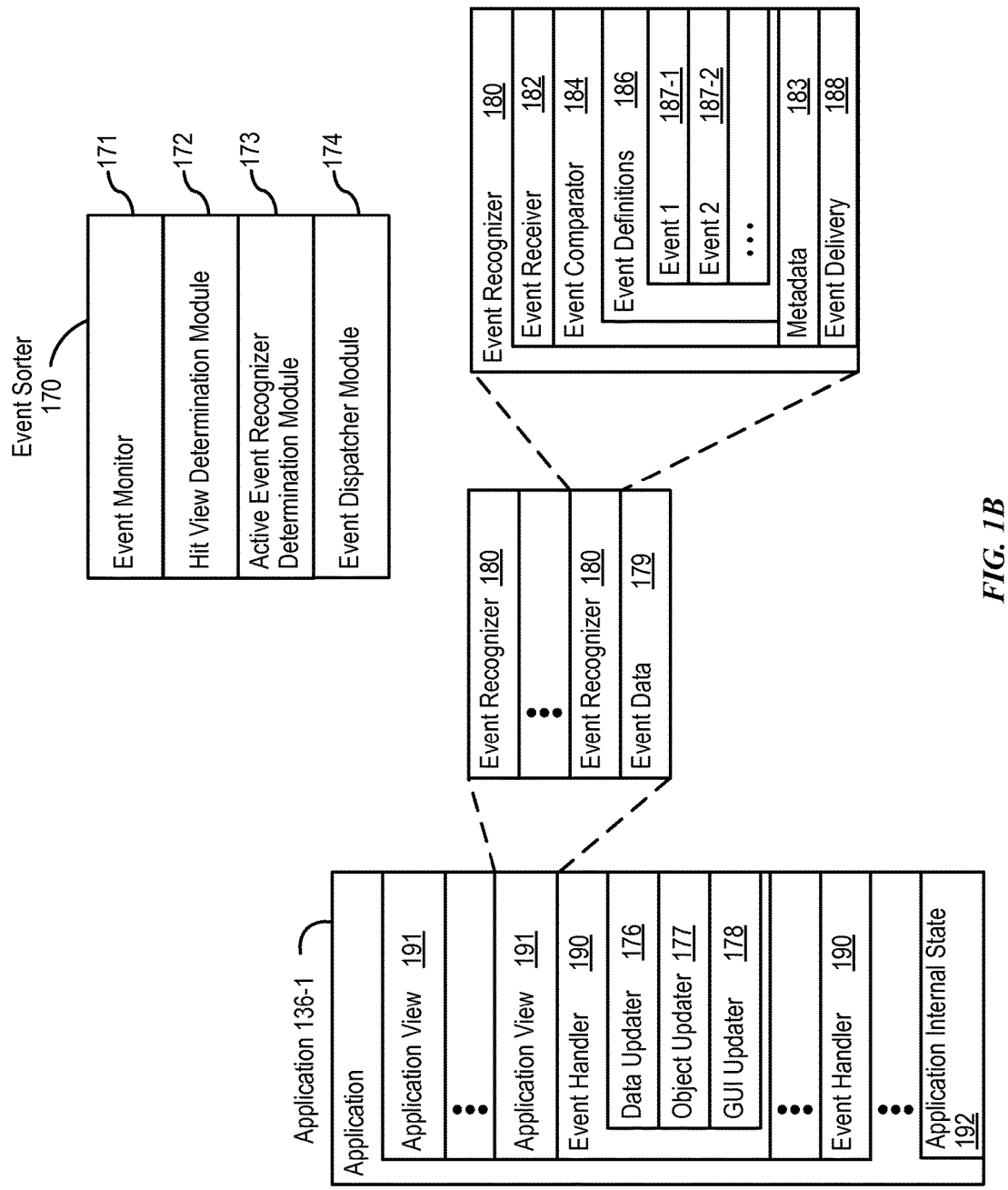
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally can correspond to programmatic levels within a programmatic or view hierarchy of the application. For example, the lowest level view in which a touch is detected optionally can be called the hit view, and the set of events that are recognized as proper inputs optionally can be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally can utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally can include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally can also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers optionally can interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
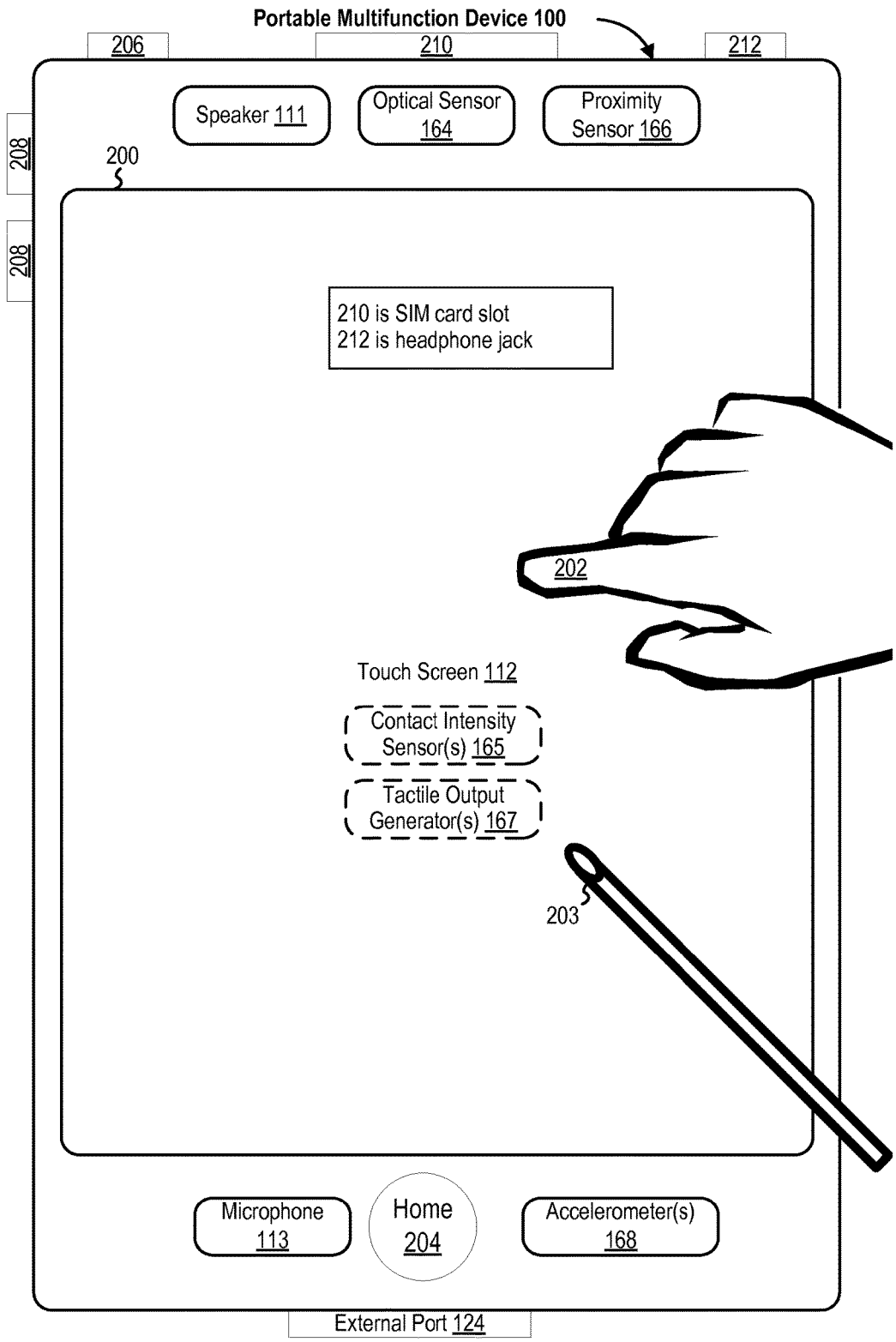
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 also optionally can include one or more physical buttons, such as "home" or menu button 204. As described previously, menu button 204 optionally can be used to navigate to any application 136 in a set of applications that optionally can be executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 optionally can be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules optionally can be combined or otherwise rearranged in various embodiments. In some embodiments, memory 370 optionally can store a subset of the modules and data structures identified above. Furthermore, memory 370 optionally can store additional modules and data structures not described above.

Attention is now directed towards embodiments of user interfaces that optionally can be implemented on, for example, portable multifunction device 100.

Figure 4A:
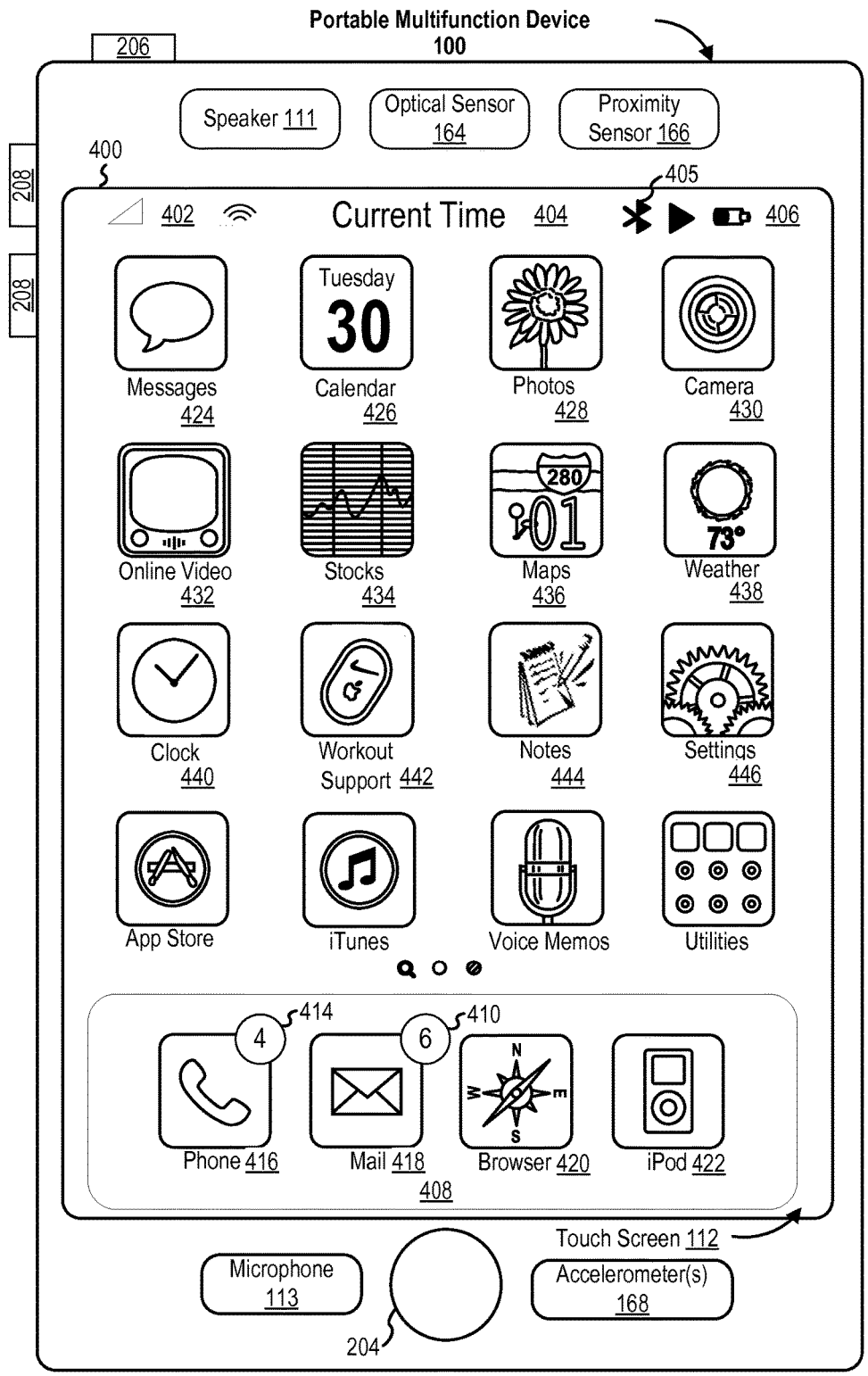
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces optionally can be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 optionally can optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
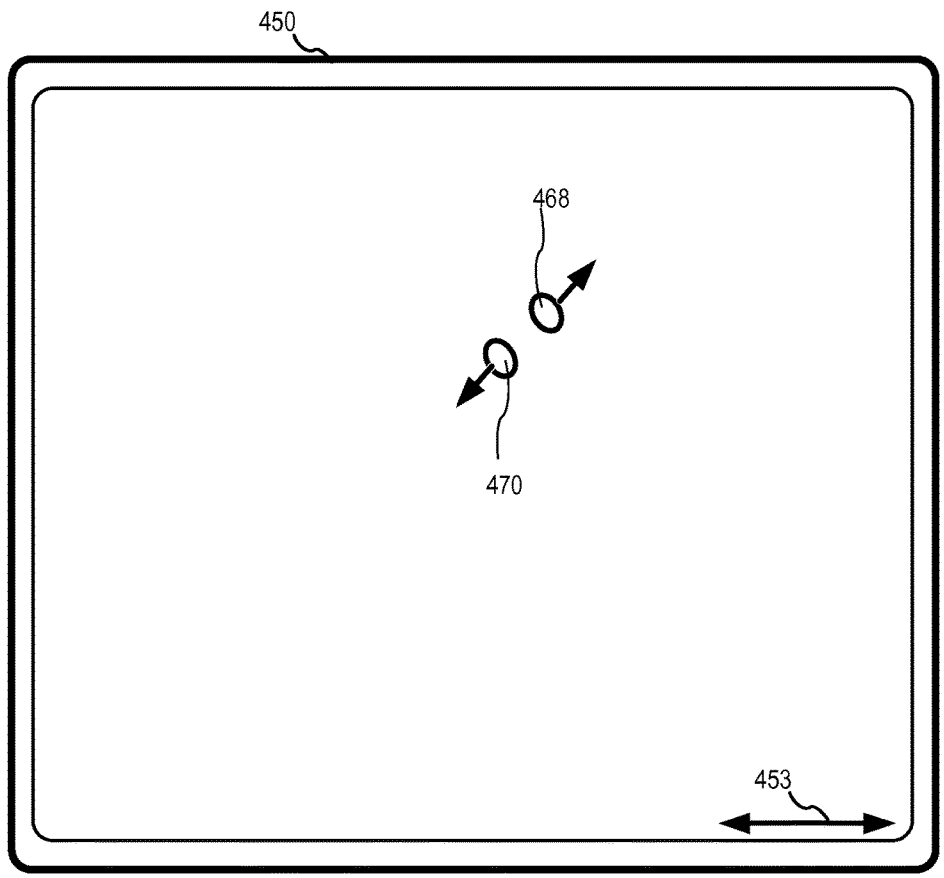
FIG. 4B illustrates an exemplary user interface for a multifunction device with a touch-sensitive surface that is separate from the display in accordance with some embodiments.
Figure 4B:
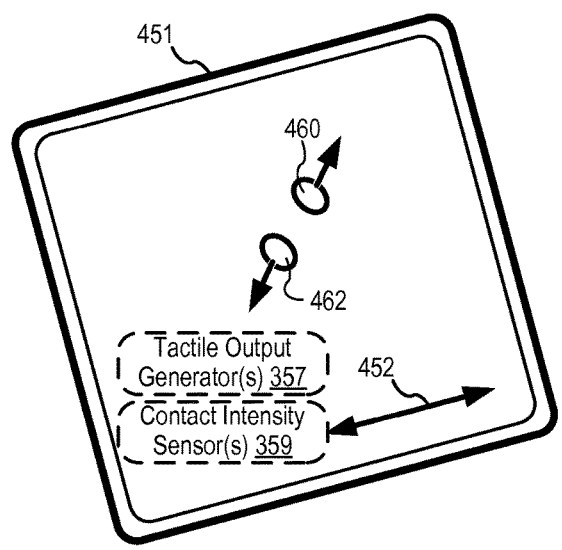

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
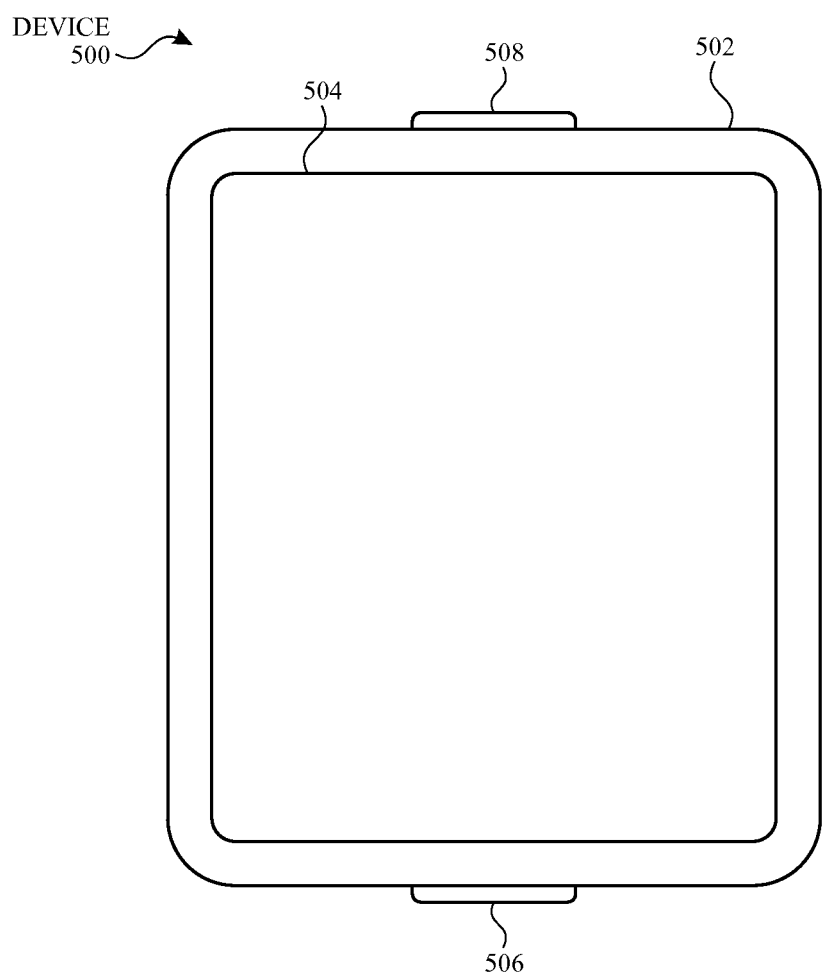
FIG. 5A illustrates a personal electronic device in accordance with some embodiments.
Figure 6A:
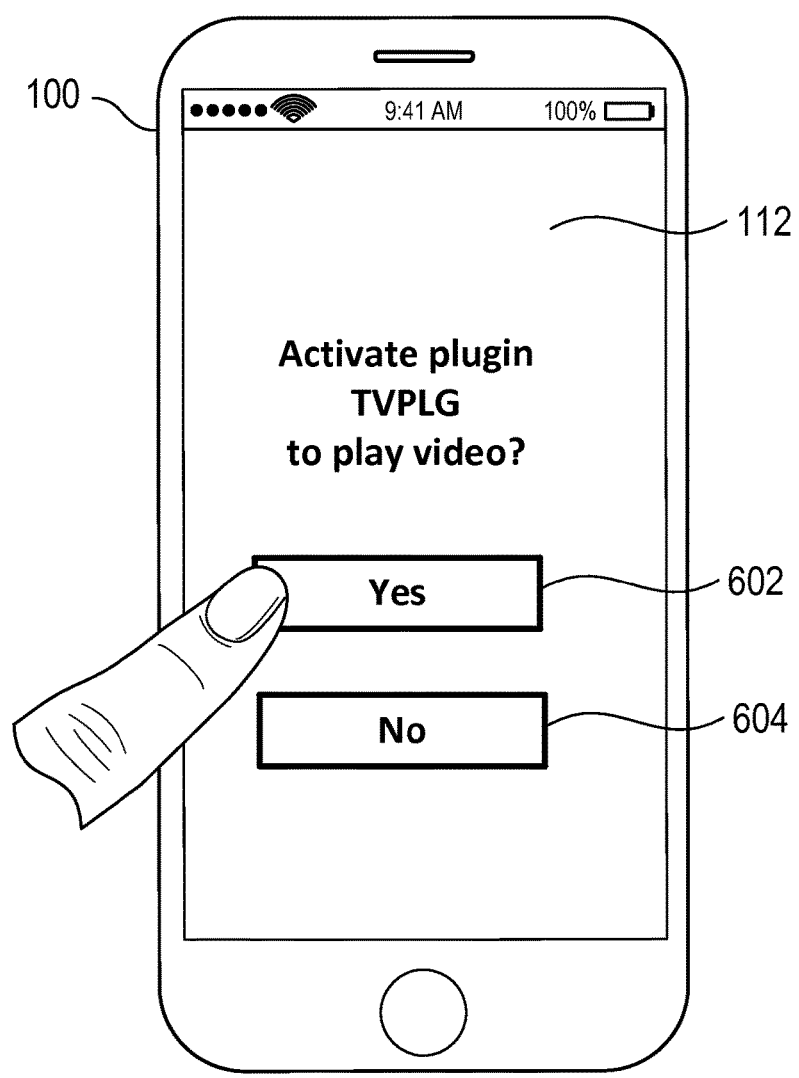
FIGS. 6A-6D illustrate exemplary user interfaces for a personal electronic device in accordance with some embodiments.
Figure 6B:
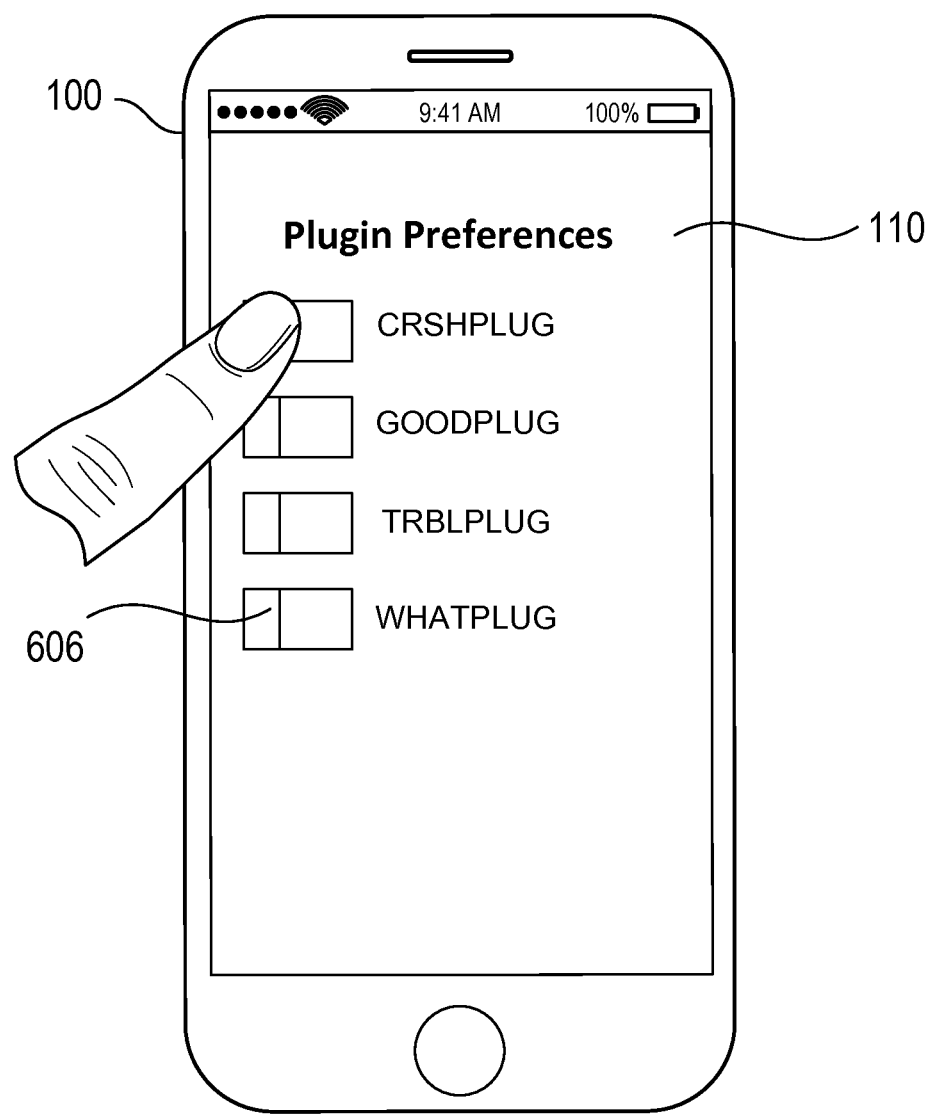

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally can have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity optionally can be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms optionally can permit device 500 to be worn by a user.

Figure 5B:
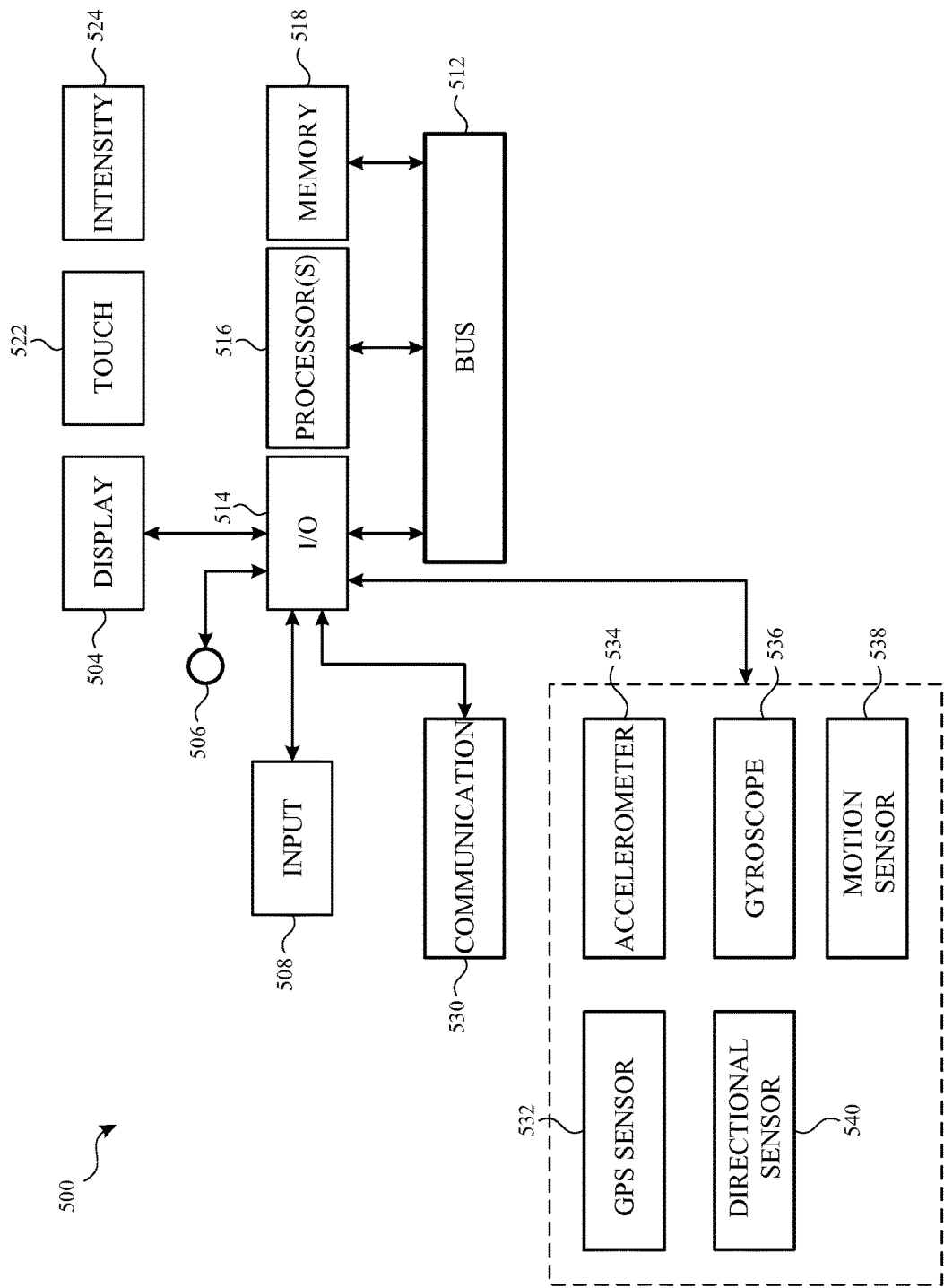
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 optionally can be a rotatable input device or a depressible and rotatable input device, for example. Input mechanism 508 optionally can be a button, in some examples.

Input mechanism 508 optionally can be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including process 700 (FIGS. 7A-7D). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that optionally can be displayed on the display screen of devices 100, 300, and/or 500 (FIGS. 1, 3, and 5). For example, an image (e.g., icon), a button, and text (e.g., hyperlink) optionally can each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input)

is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally can include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface optionally can receive a continuous swipe contact transitioning from a start location and reaching an end location, at which point the intensity of the contact increases. In this example, the characteristic intensity of the contact at the end location optionally can be based on only a portion of the continuous swipe contact, and not the entire swipe contact (e.g., only the portion of the swipe contact at the end location). In some embodiments, a smoothing algorithm optionally can be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface optionally can be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the term "open application", "executing application", "open plugin", or "executing plugin" refers to a software application or plugin with retained state information (e.g., as part of device/global internal state 157 and/or application internal state 192). An open or executing application or open or executing plugin optionally can be any one of the following types of applications or plugin:

an active application or plugin, which is currently displayed on a display screen of the device that the application or plugin is being used on;

a background application or plugin (or background processes), which is not currently displayed, but one or more processes for the application or plugin are being processed by one or more processors; and a suspended or hibernated application or plugin, which is not running, but has state information that is stored in memory (volatile and non-volatile, respectively) and that can be used to resume execution of the application or plugin.

As used herein, the term "closed application" or "closed plugin" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that optionally can be implemented on an electronic device, such as portable multifunction device 100, device 300, or device 500.

FIGS. 6A-6D illustrate exemplary user interfaces relating to the disabling of installed plugins, in accordance with some embodiments. The user interfaces in these figures are used to illustrate the processes described below, including the processes in FIGS. 7A-7D.

FIG. 6A illustrates an affordance (602) for activating the installed plugin on a display (112) of an electronic device (100). As described elsewhere in this document, the affordance (602) is touchable, clickable, or otherwise selectable by the user. Associated with the affordance (602), a description optionally is provided to the user explaining the action associated with the affordance (602). A second affordance (604) associated with not activating the installed plugin optionally is provided on the display (112) as well.

FIG. 6B illustrates an affordance (606) associated with one or more installed plugins on a display (e.g., 112, 340, 504). As described elsewhere in this document, the affordance (606) is touchable, clickable, or otherwise selectable by the user. Associated with the affordance (606), a description optionally is provided to the user regarding the associated plugin. The affordance (606) is selectable by the user to identify a particular installed plugin as meeting the disabling criteria, or to alter the disabling criteria.

Figure 6C:
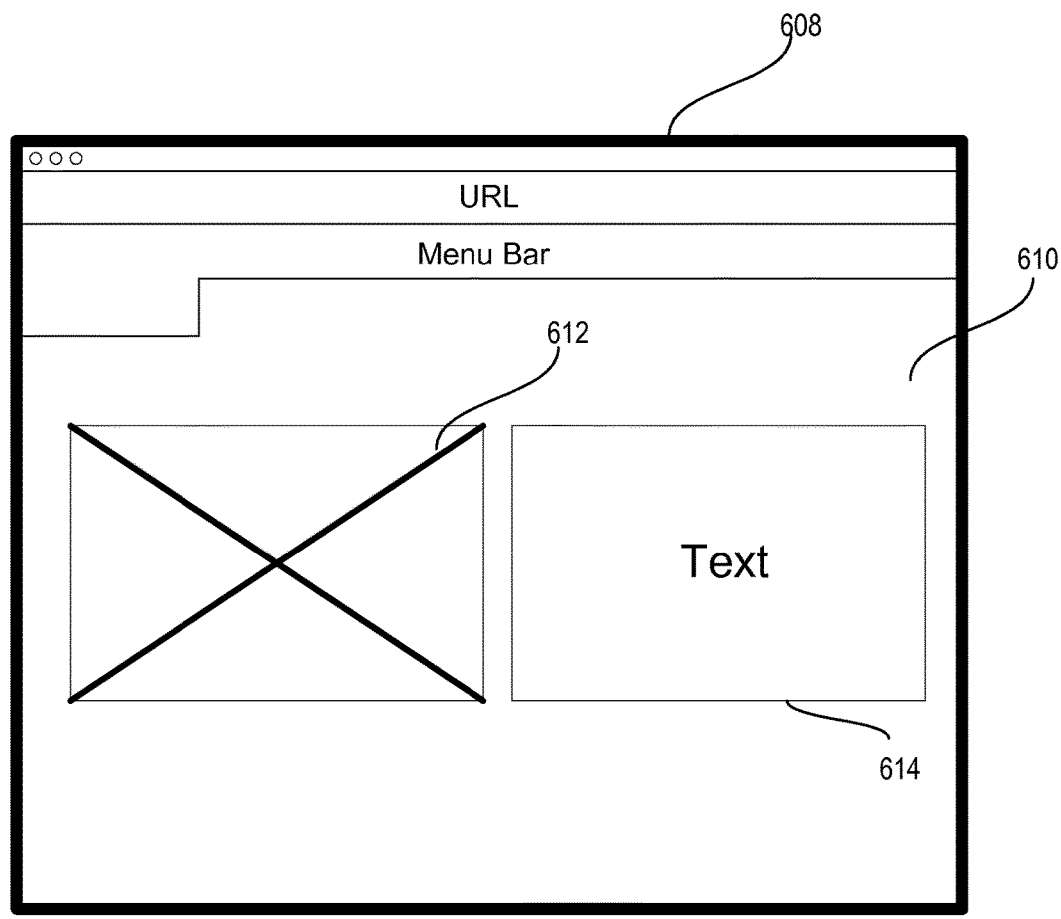

FIG. 6C illustrates a browser (e.g., 608) that is displayed on the display (e.g., 112, 340, 504). A webpage (610) is displayed in the browser application (e.g., 608). The webpage includes a media block (612), where playback of media within the media block (612) is controlled by an installed plugin (e.g., wherein markup language associated with the webpage results in the rendered media block). The X through the media block (612) schematically represents what is perceived by a user when the installed plugin that controls the media block (612) is disabled and/or not installed and therefore not available to render the media content. When the installed plugin that controls the media block (612) is disabled or not installed, the media block optionally indicates that in any suitable manner; the media block (612) optionally is crossed out as shown in FIG. 6C, grayed out, blacked out, or displayed in another manner. Text block (614) is properly rendered, since the data associated with text block (614) does not require a plugin and is therefore properly rendered by browser (e.g., 608).

Figure 6D:
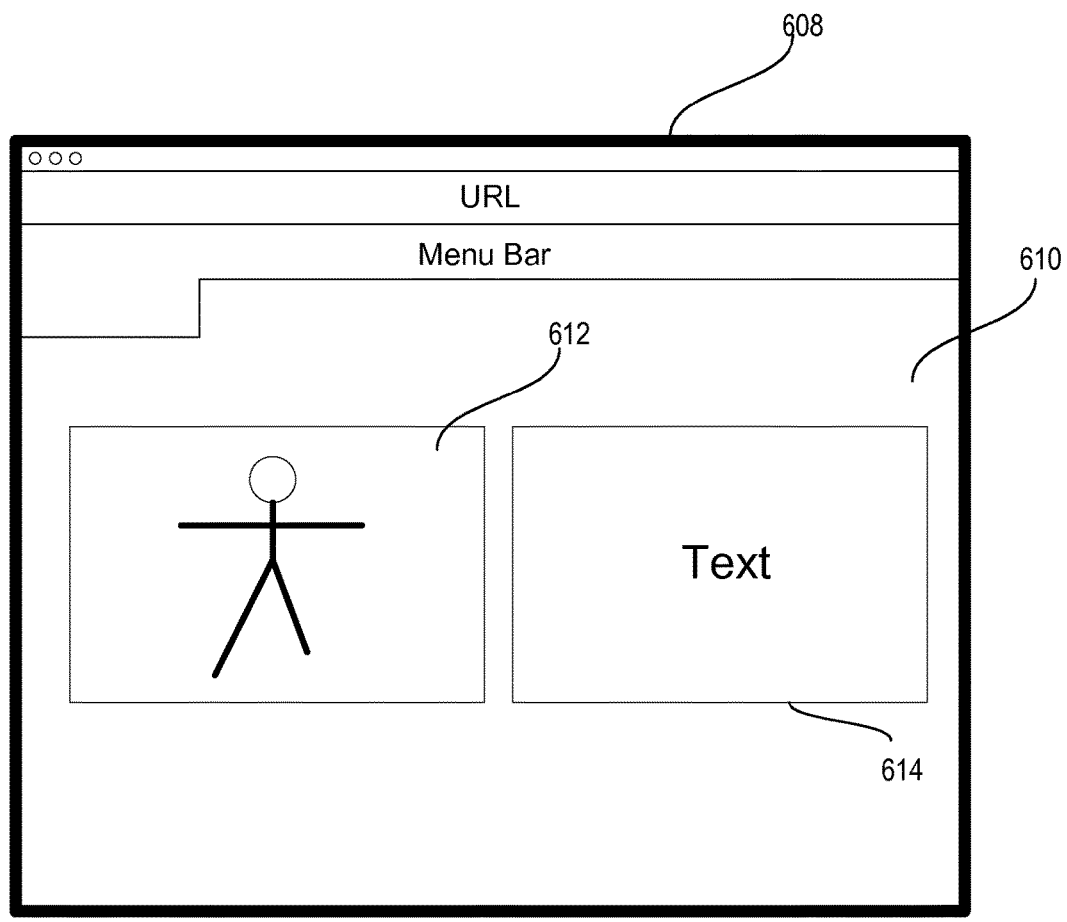
Figure 7A:
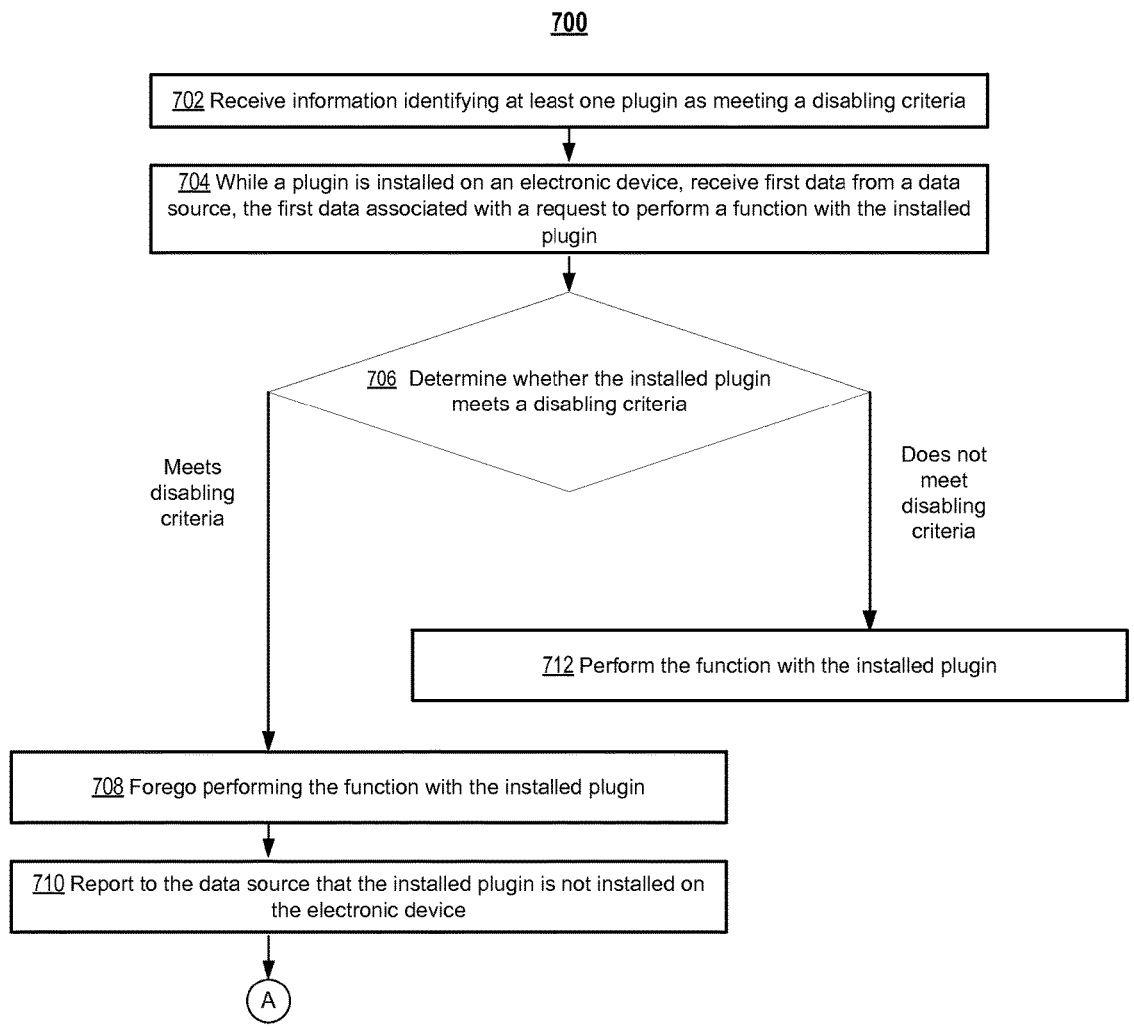
FIGS. 7A-7D illustrate a flow diagram of an exemplary process for disabling one or more plugins associated with a browser application, in accordance with some embodiments.
Figure 7B:
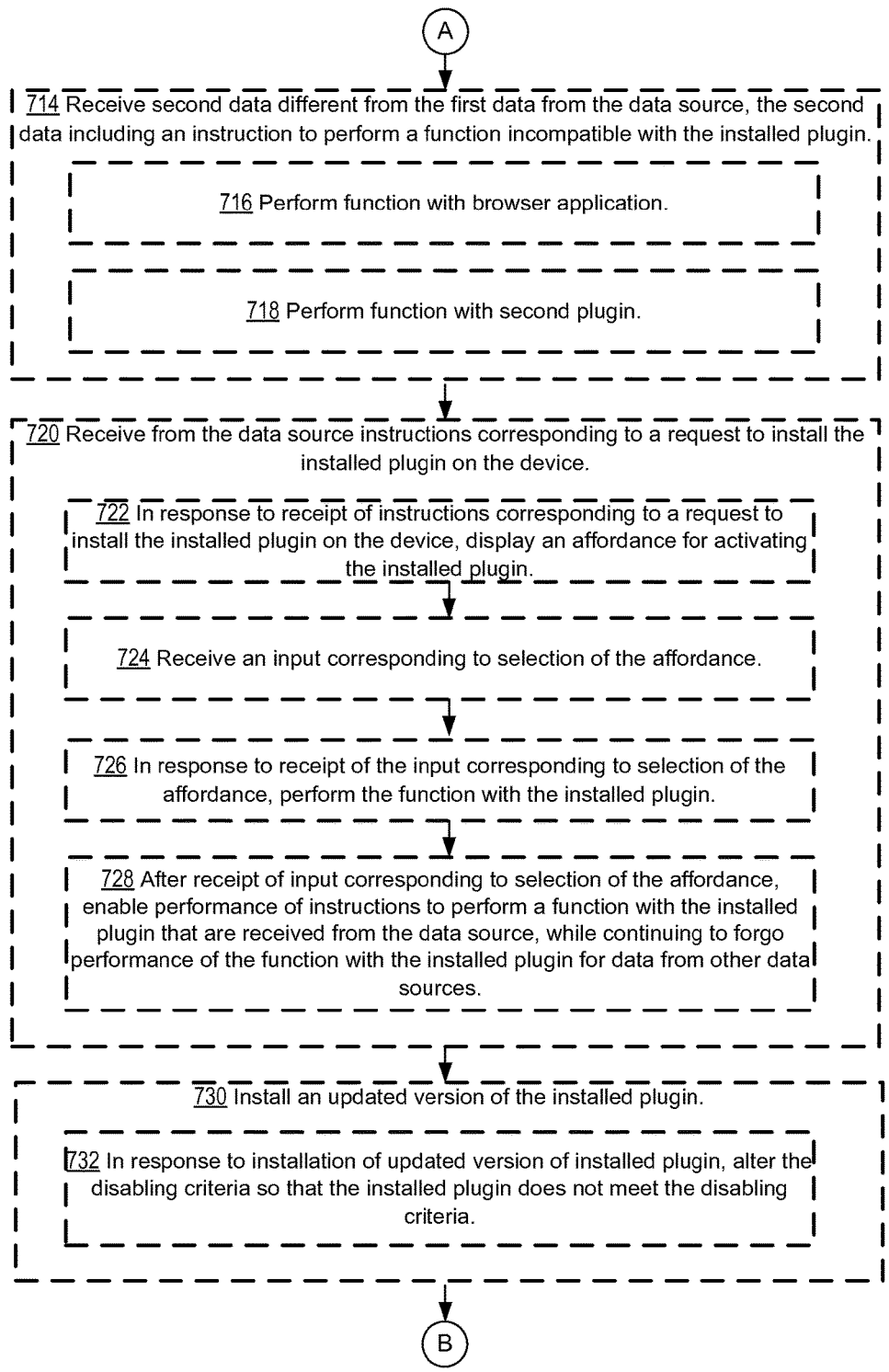
Figure 7C:
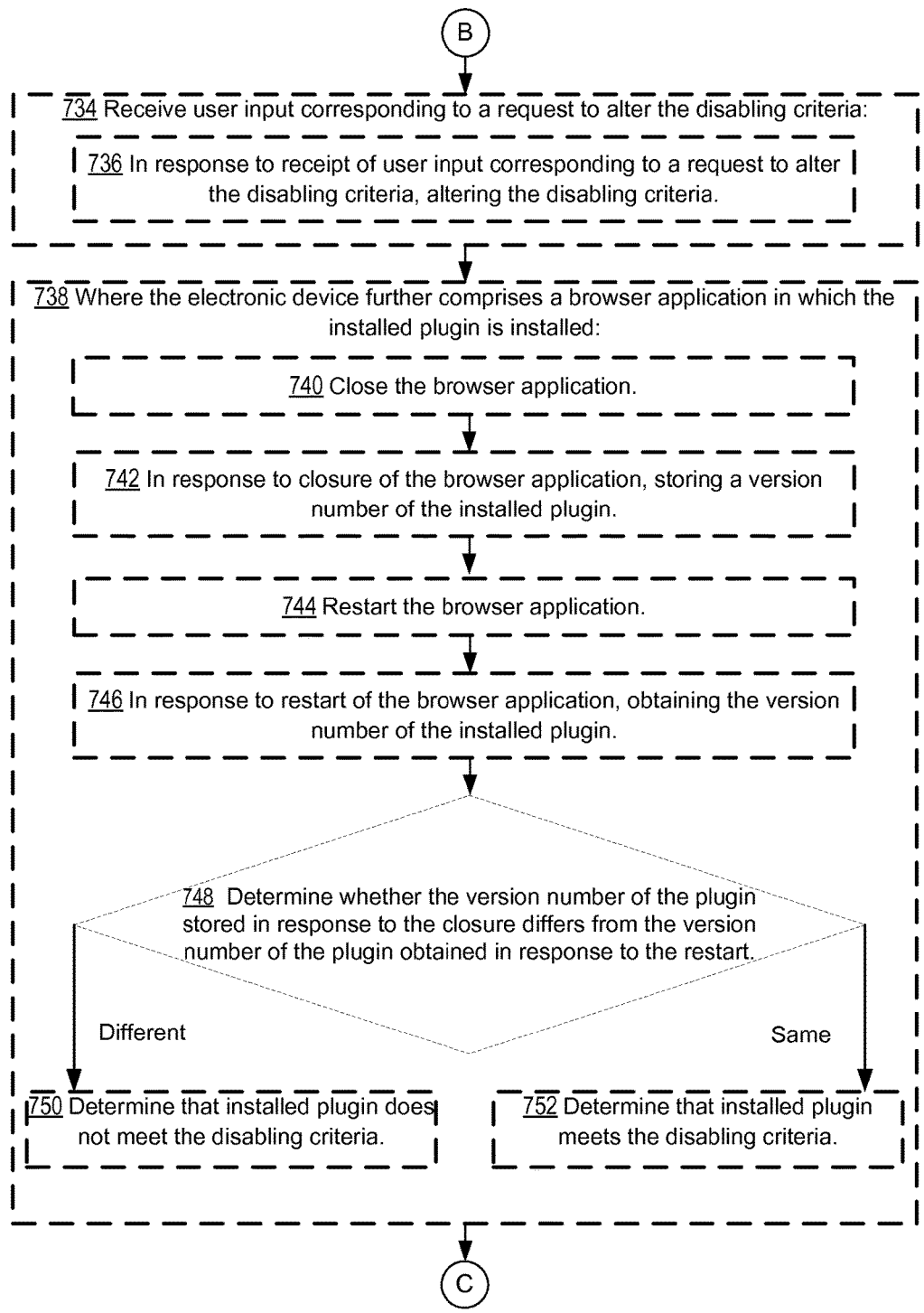
Figure 7D:
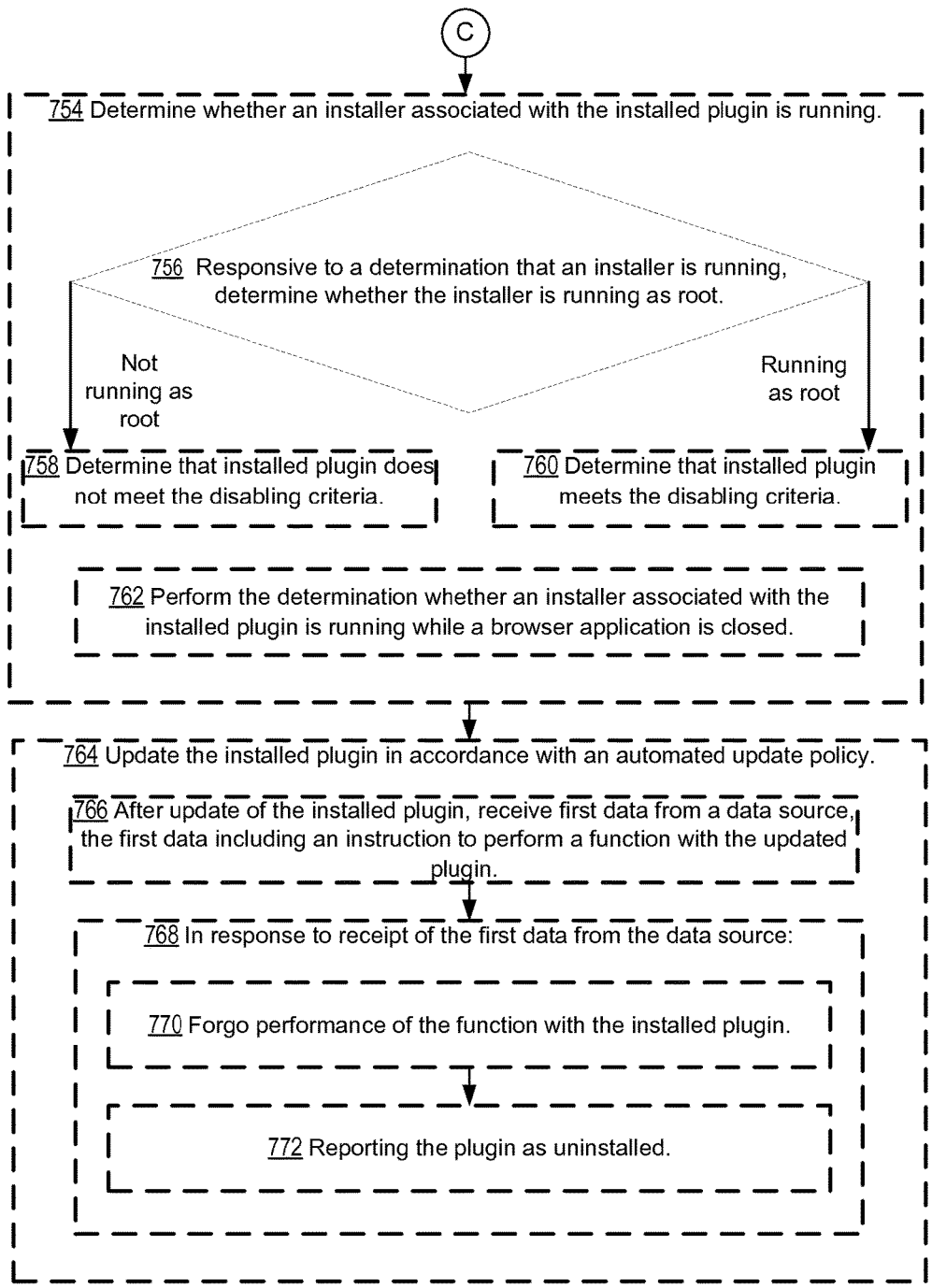

FIG. 6D illustrates the webpage of FIG. 6C, where the plugin that controls the media block (612) has been reported as installed, in accordance with the methods described herein. In some embodiments, reporting the plugin as uninstalled results in the data source (e.g., the web domain) presenting the media in an alternative format that does not require the disabled or uninstalled plugin. Visual functionality, such as video playback, has been restored, so that the user can view media in the media block (612).

FIGS. 7A-7D are a flow diagram illustrating a method for disabling one or more plugins associated with a browser application (e.g., 608) using an electronic device in accordance with some embodiments. Method 700 optionally can be performed at a device (e.g., 100, 300, 500) with a display. Some operations in method 700 optionally can be combined, the order of some operations optionally can be changed, and some operations optionally can be omitted. In particular, optional operations indicated with dashed-line shapes in FIGS. 7A-7D optionally can be performed in any suitable order, if at all, and need not be performed in the order set forth in FIGS. 7A-7D.

As described below, method 700 provides an intuitive way for disabling one or more plugins associated with a browser application (e.g., 608). The method reduces the cognitive burden on a user for disabling one or more plugins associated with a browser application, thereby creating a more efficient human-machine interface. For all devices, the present disclosure provides for increased protection against malware, and provides for display of media in preferred formats that are less susceptible to malware. For battery-operated computing devices, enabling a user to disable one or more plugins associated with a browser application (e.g., 608) faster and more efficiently conserves power and increases the time between battery charges.

In some embodiments, the electronic device (e.g., 100, 300, 500) includes a display (e.g., 112, 340, 504). A plugin is installed on the electronic device (e.g., 100, 300, 500). A plugin is a software component that adds a specific feature to a different software application. For example, a plugin optionally is used in conjunction with a web browser to add new features such as media playback. Exemplary plugins include the QuickTime® player plugin of Apple Corporation and the Flash® plugin of Adobe Corporation. A browser application (e.g., 608) optionally is installed on the electronic device (e.g., 100, 300, 500). The browser application (e.g., 608) optionally is compliant with the HTML5 standard; if so, the browser application (e.g., 608) itself is capable of playing media information in HTML5 format, without the need to use a plugin for media playback. The electronic device (e.g., 100, 300, 500) receives (702) information identifying at least one plugin as meeting a disabling criteria. The information optionally can take any suitable form and optionally can be received from any suitable source. As one example, the Xprotect software associated with the Apple Corporation Mac OS X operating system transmits information identifying at least one plugin as meeting a disabling criteria. In some embodiments, the identifying at least one plugin as meeting disabling criteria is received from an external server or any other suitable source. Disabling criteria is criteria specifying one or more plugins as identified for disabling according to the process below. For example, the criteria include a plugin name and version number or file names or other identifying data for the plugin. In this way, Xprotect or other similar software identifies certain specific plugins as banned or restricted plugins that cannot or should not be utilized. In some embodiments, the criteria include more general information associated with a plugin, such as the author, kind (e.g., video playback, audio playback, document view), or other suitable information. In some embodiments, as described in greater detail below, the disabling criteria are based at least in part on user input entered in the electronic device (e.g., 100, 300, 500).

In some embodiments, the electronic device (e.g., 100, 300, 500) receives (704) first data from a data source. For example, the first data is a webpage or information associated with a webpage, such as video data, audio data, and/or one or more links (e.g., URLs) associated with media data. The data source optionally is a server that hosts the website. In some embodiments, the server hosts audio data, video data, or other data instead of or in addition to a website. In some embodiments, the data source provides for file sharing. The first data is associated with a request to perform a function with the installed plugin described in the previous paragraph. For example, the first data is a webpage that includes video data, or a URL or link to video data that is playable by a specific plugin. That webpage optionally includes a request to play the video data with the specific plugin used to play video data of a particular format. In some circumstances, upon receiving first data from the data source, the installed plugin is running already. In some embodiments, the first data is associated with a request to perform a function with the installed plugin, where the function includes launching the installed plugin. In some embodiments, the first data is, or includes, a query from the data source about the presence of the plugin. Such a query optionally is in the form of a JavaScript or a JavaScript framework function supplied by, e.g., jQuery, or any other suitable form of query.

The electronic device (e.g., 100, 300, 500) determines (706) whether the installed plugin meets a disabling criteria. In some embodiments, the electronic device (e.g., 100, 300, 500) compares one or more characteristics or qualities of the installed plugin to the disabling criteria. In accordance with a determination that the installed plugin meets a disabling criteria; the electronic device (e.g., 100, 300, 500) forgoes (708) performing the function with the installed plugin. In some embodiments, as a result, media is not displayed in the media block (e.g., 612) of a webpage (e.g., 610) displayed in a browser application (e.g., 608), as seen in FIG. 6C. Additionally, the electronic device (e.g., 100, 300, 500) reports (710) to the data source that the installed plugin is not installed on the electronic device (e.g., 100, 300, 500). This reporting differs from known plugin handling, in which it would be reported to the data source that the installed plugin is in fact installed on the electronic device (e.g., 100, 300, 500). Optionally, the electronic device (e.g., 100, 300, 500) and/or browser application (e.g., 608) set a flag indicating that the installed plugin is not installed on the electronic device (e.g., 100, 300, 500), for faster determination if a data source attempts to utilize or invoke the installed plugin at a later time.

In accordance with a determination that the installed plugin does not meet the disabling criteria, the electronic device (e.g., 100, 300, 500) performs (712) the function with the installed plugin. For example, the electronic device (e.g., 100, 300, 500) optionally plays a video file associated with the first data in the media block (612) of a webpage (610) displayed in a browser application (e.g., 608), as seen in FIG. 6D.

In some embodiments, after reporting to the data source that the installed plugin is not installed on the electronic device, the electronic device (e.g., 100, 300, 500) receives (714) second data different from the first data from the data source. For example, the second data is alternative content from the first data, or is the same data as the first data but in a different format. As set forth above, the data source optionally is a website. The second data optionally includes an instruction to perform a function that is incompatible with the installed plugin. For example, the function is the playback of video information that is in a format incompatible with the installed plugin. In some embodiments, the electronic device (e.g., 100, 300, 500) then performs (716) the function with the browser application (e.g., 608). For example, where the browser (e.g., 608) application is compliant with the HTML5 standard, and the second data is video in HTML5 format, the function is performed in the media block (612) of a webpage (610) displayed in a browser application (e.g., 608), as seen in FIG. 6D, In some embodiments, after receiving second data different from the first data, where the second data includes an instruction to perform a second function incompatible with the installed plugin but is compatible with a second installed plugin, the electronic device then performs (718) the function with the second installed plugin. For example, the second plugin is capable of playing audio in a format that the installed plugin is not capable of playing. The second data optionally includes an instruction to perform a second function with a second installed plugin distinct from the first installed plugin.

In some embodiments, after reporting to the data source that the installed plugin is not installed on the electronic device (e.g., 100, 300, 500), the electronic device (e.g., 100, 300, 500) receives (720) from the data source instructions corresponding to a request to install the installed plugin on the device. Such instructions optionally are included in the first data originally transmitted to the electronic device (e.g., 100, 300, 500), or optionally are transmitted to the electronic device (e.g., 100, 300, 500) by the data source in response to reporting that the installed plugin is not installed on the electronic device (e.g., 100, 300, 500). In response to receiving the instructions corresponding to a request to install the installed plugin on the electronic device (e.g., 100, 300, 500), the electronic device (e.g., 100, 300, 500) optionally displays (722) an affordance (602) for activating the installed plugin on a display (e.g., 112, 340, 504) (FIG. 6A). As described elsewhere in this document, the affordance (e.g., 602) optionally is touchable, clickable, or otherwise selectable by the user. Associated with the affordance (e.g., 602), a description optionally is provided to the user explaining the action associated with the affordance (e.g., 602). A second affordance (604) associated with not activating the installed plugin optionally is provided on the display (e.g., 112, 340, 504) as well. The electronic device (e.g., 100, 300, 500) optionally receives (724) an input corresponding to selection of the affordance (e.g., 602). In response to receiving the input corresponding to selection of the affordance (e.g., 602), the electronic device (e.g., 100, 300, 500) optionally performs (726) a function with the installed plugin associated with the first data. Additionally, or instead, after receiving the input corresponding to selection of the affordance, the electronic device (e.g., 100, 300, 500) optionally enables (728) performance of instructions to perform a function with the installed plugin that are received from the data source, while continuing forgoing performance of the function with the installed plugin for data from other data sources. In some embodiments, the installed plugin is enabled only for particular data sources such as particular websites, where there is a need or user desire to utilize the installed plugin even though it meets disabling criteria.

Optionally, the user chooses to install (730) an updated version of the installed plugin. Often, older versions of a plugin meet the disabling criteria; in contrast, the most recent version of a plugin has been updated to withstand security threats. In response to installing the updated version of the installed plugin, the disabling criteria are altered (732) so that the installed plugin does not meet the disabling criteria. Alternately, the updated version of the installed plugin does not meet the original, unaltered disabling criteria. As a result, the electronic device (e.g., 100, 300, 500) performs a function with the updated, installed plugin associated with the first data.

Optionally, the electronic device (e.g., 100, 300, 500) receives input from a user identifying at least one plugin as meeting the disabling criteria. Additionally, or instead, the electronic device (e.g., 100, 300, 500) optionally receives (734) input from a user altering the disabling criteria. For example, the electronic device (e.g., 100, 300, 500) displays an affordance (606) associated with one or more installed plugins on a display (e.g., 112, 340, 504) (FIG. 6B). As described elsewhere in this document, the affordance (e.g., 606) optionally is touchable, clickable, or otherwise selectable by the user. Associated with the affordance (e.g., 606), a description optionally is provided to the user regarding the associated plugin. The user optionally selects the affordance (606) to identify a particular installed plugin as meeting the disabling criteria, or to alter the disabling criteria. In response to receiving user input corresponding to a request to alter the disabling criteria, the electronic device (e.g., 100, 300, 500) optionally alters (736) the disabling criteria. By affirmatively choosing to run the installed plugin, such as by engaging an affordance in a preferences menu or in any other suitable manner, the user alters the disabling criteria.

In some embodiments, the affirmative user update of an installed plugin is inferred in one or more different ways. In some embodiments, the installed plugin is installed (738) in a browser application (e.g., 608) on the electronic device (e.g., 100, 300, 500). The electronic device (e.g., 100, 300, 500) can close (740) the browser application (e.g., 608), with or without user input. In response to closing the browser application, the electronic device (e.g., 100, 300,

500) optionally stores (742) a version number of the installed plugin. The electronic device (e.g., 100, 300, 500) restarts (744) the browser application (e.g., 608), with or without user input. In response to the restarting the browser application, the electronic device optionally obtains (746) the version number of the installed plugin. The electronic device (e.g., 100, 300, 500) determines (748) whether the version number of the plugin stored in response to closing the browser application differs from the version number of the plugin obtained in response to restarting the browser application (e.g., 608). In accordance with a determination that the version of the plugin stored in response to closing the browser application is different from the version of the plugin obtained in response to restarting the browser application (e.g., 608), the electronic device (e.g., 100, 300, 500) determines (750) that the installed plugin does not meet the disabling criteria. Because the version number of the installed plugin has changed, it is inferred that the user affirmatively updated the installed plugin. In accordance with a determination that the version of the plugin stored in response to closing the browser application (e.g., 608) is the same as the version of the plugin obtained in response to restarting the browser (e.g., 608) application, the electronic device (e.g., 100, 300, 500) determines (752) that the installed plugin still meets the disabling criteria. In some embodiments, the electronic device determines that the installed plugin does not meet the disabling criteria if the version number of the installed plugin obtained in response to restarting is greater than the version number of the installed plugin stored in response to closing the browser application. In some embodiments, the version numbers compared are the version number stored at the time when the plugin is disabled and the version number at the time a request to re-launch the plugin (e.g., at browser launch or when a webpage provides instructions to launch the plugin) is received by the electronic device. In some embodiments, the values compared are the modification date of the plugin at the time the plugin is disabled and the modification date of the plugin at the time the a request to re-launch the plugin (e.g., at browser launch or when a webpage provides instructions to launch the plugin) is received by the electronic device.

The version numbers are the same, so it is inferred that the user took no action to update the installed plugin.

Optionally, a different process is used to infer whether an installed plugin has been updated as a result of affirmative user choice. For example, the electronic device (e.g., 100, 300, 500) determines (754) whether an installer associated with the installed plugin is running. Responsive to a determination that an installer is running, the electronic device (e.g., 100, 300, 500) determines (756) whether the installer is running as root. In accordance with a determination that the installer is not running as root, the electronic device (e.g., 100, 300, 500) determines (758) that the installed plugin does not meet the disabling criteria. Because the installer is not running as root, it is inferred that the installer is running as a result of its deliberate activation by the user. In accordance with a determination that the installer is running as root, the electronic device (e.g., 100, 300, 500) determines (760) that the installed plugin meets the disabling criteria. Because the installer is running as root, it is inferred that the installer is attempting an automatic update of the installed plugin, and that the user took no action to update the installed plugin. Optionally, determining whether an installer associated with the installed plugin is running is performed (762) while a browser application is closed, where the installed plugin is associated with that browser application.

In some embodiments, the electronic device (e.g., 100, 300, 500) updates (764) the installed plugin in accordance with an automated update policy. For example, the installed plugin is updated in respond to an external command. As another example, the installed plugin is updated as a consequence of an automated update schedule. After updating the installed plugin, the electronic device (e.g., 100, 300, 500) optionally receives (766) first data from a data source, where the first data includes an instruction to perform a function with the updated plugin. In response to receiving (768) the first data from the data source, the electronic device (e.g., 100, 300, 500) forgoes (770) performance of the function with the installed plugin, and reports (772) the plugin as uninstalled to the data source. Because the installed plugin was updated automatically, without affirmative user action to update the plugin, the status of the plugin as covered by the disabling criteria is unchanged. As a result, media is not displayed in the media block (612) of a webpage (610) displayed in a browser application (e.g., 608), as seen in FIG. 6C. As set forth above, in some embodiments, a flag is set for an installed plugin when the installed plugin meets the disabling criteria; if so, the flag is not cleared when the installed plugin is updated automatically.

Figure 8:
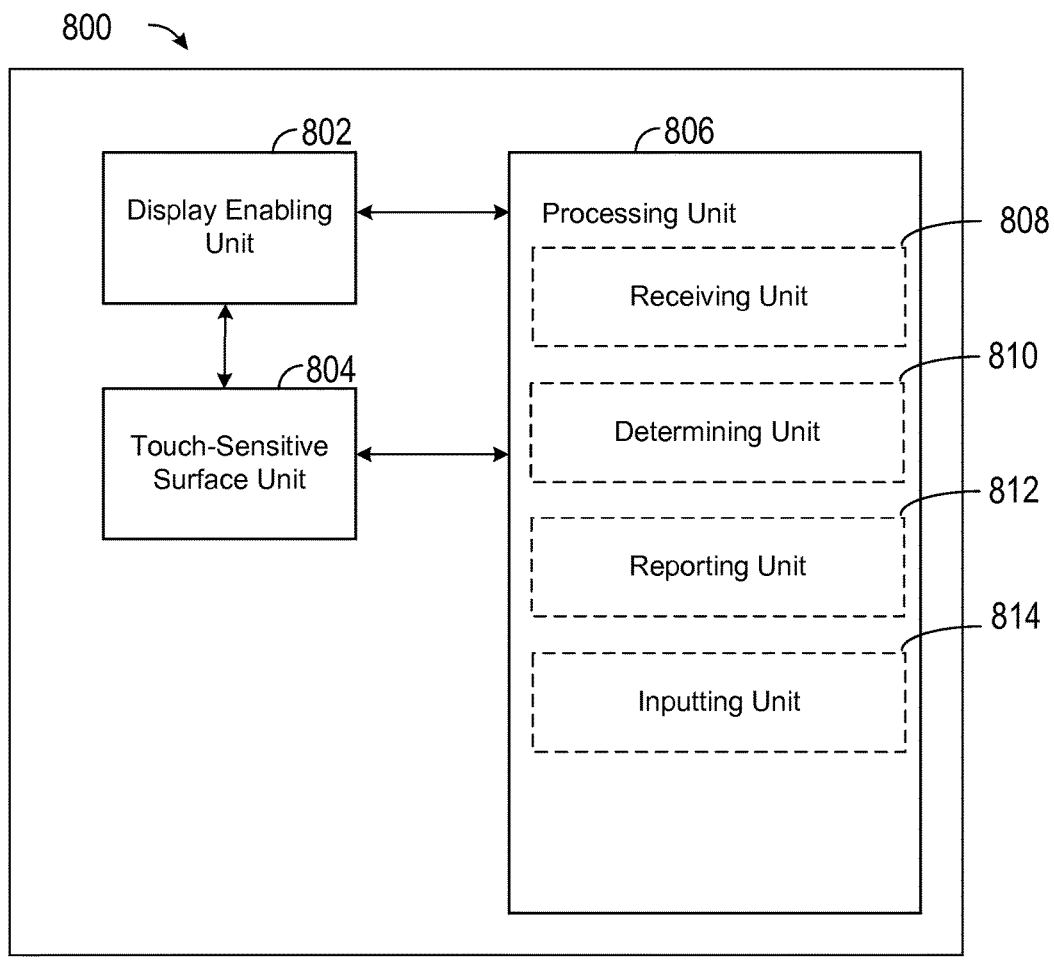
FIG. 8 is a functional block diagram of an electronic device in accordance with some embodiments.

In accordance with some embodiments, FIG. 8 shows an exemplary functional block diagram of an electronic device 800 configured in accordance with the principles of the various described embodiments. In accordance with some embodiments, the functional blocks of electronic device 800 are configured to perform the techniques described above. The functional blocks of the device 800 are, optionally, implemented by hardware, software, or a combination of hardware and software to carry out the principles of the various described examples. It is understood by persons of skill in the art that the functional blocks described in FIG. 8 are, optionally, combined or separated into sub-blocks to implement the principles of the various described examples. Therefore, the description herein optionally supports any possible combination or separation or further definition of the functional blocks described herein.

As shown in FIG. 8, an electronic device (800) includes a display enabling unit (802) configured to display a graphic user interface, optionally, a touch-sensitive surface unit (804) configured to receive contacts, and a processing unit (806) coupled to the display enabling unit (802) and, optionally, the touch-sensitive surface unit (804). In some embodiments, the processing unit 806 includes a receiving unit (808), a determining unit (810), a reporting unit (812), and/or an inputting unit (814).

The processing unit (806) includes, a determining unit (810), a reporting unit (812), and an inputting unit (814), and the processing unit is configured to enable (e.g., with processing unit 806), while a plugin is installed on the device, receiving (e.g., with processing unit 806) first data from a data source, the first data associated with the installed plugin; and determine (e.g., with the determining unit 810), in response to receipt of the first data from the data source while the plugin is installed on the device, if the installed plugin meets a disabling criteria. In accordance with a determination that the installed plugin meets a disabling criteria, the processing unit (806) is configured to forgo performance of a function with the installed plugin; and report with the reporting unit (812) to the data source that the installed plugin is not installed on the electronic device. As a result, media is not displayed in the media block (612) of a webpage (610) displayed in a browser application (e.g., 608), as seen in FIG. 6C. In accordance with a determination that the installed plugin does not meet the disabling criteria, the processing unit (806) is configured to perform the function with the installed plugin. As a result, media is displayed in the media block (612) of a webpage (610) displayed in a browser application (e.g., 608), as seen in FIG. 6D. In some embodiments, the first data is a query from the data source about the presence of the plugin. In some embodiments, the first data is an instruction to perform a function with the installed plugin.

In some embodiments, the processing unit (806) is further configured to, after the report to the data source that the installed plugin is not installed on the electronic device (e.g., 100, 300, 500), and while a browser application (e.g., 608) is installed on the device, receive (e.g., with the receiving unit 808) second data different from the first data from the data source, the second data including an instruction to perform a second function incompatible with the installed plugin; and perform (e.g., with the processing unit 806) the second function with the browser application (e.g., 608).

In some embodiments, the processing unit (806) is further configured to, after reporting to the data source that the installed plugin is not installed on the electronic device, and while a second plugin is installed on the device, receive (e.g., with the receiving unit 808) second data different from the first data from the data source, the second data including an instruction to perform a second function incompatible with the installed plugin; and perform (e.g., with the processing unit 806) the second function with the second plugin.

In some embodiments, where the second data includes an instruction to perform a second function with a second installed plugin distinct from the first installed plugin, the processing unit (806) is further configured to perform (e.g., with processing unit 806) the second function with the second plugin.

In some embodiments, where the installed plugin meets the disabling criteria, and a display enabling unit (802) and a touch-sensitive surface unit (804) are coupled to the processing unit, the processing unit (806) is further configured to receive (e.g., with the receiving unit 808) from the data source instructions corresponding to a request to install the installed plugin on the device. In response to receipt of the instructions corresponding to a request to install the installed plugin on the device, the electronic device (800) is further configured to enable the display (e.g., with the display enabling unit 802) of an affordance for activating the installed plugin. In some embodiments, the touch-sensitive surface unit (804) receives an input corresponding to selection of the affordance, and in response to receipt of the input corresponding to selection of the affordance, the processing unit (806) is further configured to perform (e.g., with the processing unit 800) the function with the installed plugin.

In some embodiments, the processing unit (800) is further configured to, after receipt of the input corresponding to selection of the affordance, enable (e.g., with the processing unit 800) performance of instructions to perform a function with the installed plugin that are received from the data source, while continuing to forgo (e.g., with the processing unit 800) performance of the function with the installed plugin for data from other data sources.

In some embodiments the installed plugin is a multimedia player.

In some embodiments the inputting unit (814) is further configured to receive input from a user identifying at least one plugin as meeting the disabling criteria.

In some embodiments, where the installed plugin meets the disabling criteria, the processing unit (800) is further configured to install (e.g., with the processing unit 800) an updated version of the installed plugin; in response to installation of the updated version of the installed plugin, alter (e.g., with the processing unit 806) the disabling criteria so that the installed plugin does not meet the disabling criteria.

In some embodiments, where the installed plugin meets the disabling criteria, the processing unit (800) is further configured to receive (e.g., with the receiving unit 808) user input corresponding to a request to alter the disabling criteria; and in response to receipt of user input corresponding to a request to alter the disabling criteria, alter (e.g., with the processing unit 800) the disabling criteria.

In some embodiments, where the electronic device further includes a browser application in which the installed plugin is installed; the processing unit (800) is further configured to close (e.g., with the processing unit 800) the browser application; in response to closure of the browser application, store (e.g., with the processing unit 800) a version number of the installed plugin (or a modification date of the installed plugin); restart (e.g., with the processing unit 800) the browser application; and in response to the restart of the browser application (or the installed plugin); obtain (e.g., with the processing unit 800) the version number of the installed plugin (or the modification date of the installed plugin). In some embodiments, the processing unit (800) is further configured to determine (e.g., with the determining unit 810) whether the version number of the plugin stored in response to the closing differs from the version number of the plugin obtained in response to the restarting. In accordance with a determination that the version of the plugin stored in response to the closing is different from the version of the plugin obtained in response to the restarting, determine (e.g., with the determining unit 810) that the installed plugin does not meet the disabling criteria. In accordance with a determination that the version of the plugin stored in response to the closing is the same as the version of the plugin obtained in response to the restarting, determine (e.g., with the determining unit 810) that the installed plugin meets the disabling criteria.

In some embodiments, the processing unit (806) is further configured to determine (e.g., with the determining unit 810) whether an installer associated with the installed plugin is running; responsive to a determination that an installer is running, determine (e.g., with the determining unit 810) whether the installer is running as root; in accordance with a determination that the installer is not running as root, determine (e.g., with the determining unit 810) that the installed plugin does not meet the disabling criteria; and in accordance with a determination that the installer is running as root, determine (e.g., with the determining unit 810) that the installed plugin meets the disabling criteria. In some embodiments, while a browser application is installed on the device, the determination (e.g., with the determining unit 810) whether an installer associated with the installed plugin is running is performed (e.g., with the processing unit 806) while the browser application is closed or while the browser application is open.

In some embodiments, where the installed plugin meets the disabling criteria, the processing unit (806) is further configured to update (e.g., with the processing unit 806) the installed plugin in accordance with an automated update policy; and after updating the installed plugin, receive (e.g., with the processing unit 806) first data from a data source, the first data including an instruction to perform a function with the (automatically) updated plugin. In some embodiments, in response to receipt of the first data from the data source, the processing unit (806) is further configured to forgo (e.g., with the processing unit 806) performance of the function with the installed plugin; and report (e.g., with the reporting unit 812) the plugin as uninstalled.

The operations described above with reference to FIGS. 7A-7D are, optionally, implemented by components depicted in FIGS. 1A-1B or FIG. 8. For example, event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A non-transitory computer-readable storage medium storing one or more programs, the one or more programs comprising instructions, which when executed by an electronic device with a display, cause the electronic device to:
   while a plugin is actually installed on the electronic device, receive first data from a data source, the first data associated with the installed plugin;
   in response to receipt of the first data from the data source while the plugin is installed on the electronic device, determine if the installed plugin meets a disabling criteria;
   in accordance with a determination that the installed plugin meets a disabling criteria:
     forgo performance of a function with the installed plugin; and
     report to the data source that the installed plugin is not installed on the electronic device, even when it is actually installed;
   in accordance with a determination that the installed plugin does not meet the disabling criteria, perform a function with the installed plugin.

2. The non-transitory computer-readable storage medium of claim 1, wherein the first data is a query from the data source about a presence of the plugin.

3. The non-transitory computer-readable storage medium of claim 1, wherein the first data is an instruction to perform a function with the installed plugin.

4. The non-transitory computer-readable storage medium of claim 1, wherein the one or more programs further comprise instructions, which when executed by the one or more processors of the electronic device, cause the electronic device to:
   after the report to the data source that the installed plugin is not installed on the electronic device, while a browser application is installed on the electronic device, receive second data different from the first data from the data source, the second data including an instruction to perform a second function incompatible with the installed plugin; and
   perform the second function with the browser application.

5. The non-transitory computer-readable storage medium of claim 1, wherein the one or more programs further comprise instructions, which when executed by the one or more processors of the electronic device, cause the electronic device to:
   after the report to the data source that the installed plugin is not installed on the electronic device, while a second plugin is installed on the electronic device, receive second data different from the first data from the data source, the second data including an instruction to perform a second function incompatible with the installed plugin; and
   perform the second function with the second plugin.

6. The non-transitory computer-readable storage medium of claim 5, wherein the one or more programs further comprise instructions, which when executed by the one or more processors of the electronic device, cause the electronic device to:
   wherein the second data includes the instruction to perform the second function with the second installed plugin distinct from the first installed plugin:
   perform the second function with the second plugin.

7. The non-transitory computer-readable storage medium of claim 1, wherein the one or more programs further comprise instructions, which when executed by the one or more processors of the electronic device, cause the electronic device to:
   wherein the installed plugin meets the disabling criteria:
     receive from the data source instructions corresponding to a request to install the installed plugin on the electronic device;
     in response to receipt of the instructions corresponding to a request to install the installed plugin on the electronic device, display an affordance for activating the installed plugin;
     receive an input corresponding to selection of the affordance,
     in response to receipt of the input corresponding to selection of the affordance, perform the function with the installed plugin.

8. The non-transitory computer-readable storage medium of claim 7, wherein the one or more programs further comprise instructions, which when executed by the one or more processors of the electronic device, cause the electronic device to:

after receipt of the input corresponding to selection of the affordance, enable performance of instructions to perform a function with the installed plugin that are received from the data source, while continuing to forgo performance of the function with the installed plugin for data from other data sources.

9. The non-transitory computer-readable storage medium of claim 1, wherein the installed plugin is a multimedia player.

10. The non-transitory computer-readable storage medium of claim 1, wherein the one or more programs further comprise instructions, which when executed by the one or more processors of the electronic device, cause the electronic device to:

wherein the installed plugin meets the disabling criteria:
install an updated version of the installed plugin;
in response to installation of the updated version of the installed plugin, alter the disabling criteria so that the installed plugin does not meet the disabling criteria.

11. The non-transitory computer-readable storage medium of claim 1, wherein the one or more programs further comprise instructions, which when executed by the one or more processors of the electronic device, cause the electronic device to:

receive input from a user identifying at least one plugin as meeting the disabling criteria.

12. The non-transitory computer-readable storage medium of claim 1, wherein the one or more programs further comprise instructions, which when executed by the one or more processors of the electronic device, cause the electronic device to:

wherein the installed plugin meets the disabling criteria:
receive user input corresponding to a request to alter the disabling criteria; and
in response to receipt of user input corresponding to a request to alter the disabling criteria, alter the disabling criteria.

13. The non-transitory computer-readable storage medium of claim 1, wherein the one or more programs further comprise instructions, which when executed by the one or more processors of the electronic device, cause the electronic device to:

wherein the electronic device further comprises a browser application in which the installed plugin is installed:
close the browser application;
in response to closure of the browser application, store a version number of the installed plugin;
restart the browser application;
in response to the restart of the browser application; obtain the version number of the installed plugin;
determine whether the version number of the plugin stored in response to the closing differs from the version number of the plugin obtained in response to the restarting;
in accordance with a determination that the version of the plugin stored in response to the closure is different from the version of the plugin obtained in response to the restarting, determine that the installed plugin does not meet the disabling criteria;
in accordance with a determination that the version of the plugin stored in response to the closure is the same as the version of the plugin obtained in response to the restarting, determine that the installed plugin meets the disabling criteria.

14. The non-transitory computer-readable storage medium of claim 1, wherein the one or more programs further comprise instructions, which when executed by the one or more processors of the electronic device, cause the electronic device to:

determine whether an installer associated with the installed plugin is running;
responsive to a determination that an installer is running, determine whether the installer is running as root;
in accordance with a determination that the installer is not running as root, determine that the installed plugin does not meet the disabling criteria; and
in accordance with a determination that the installer is running as root, determine that the installed plugin meets the disabling criteria.

15. The non-transitory computer-readable storage medium of claim 14, wherein the one or more programs further comprise instructions, which when executed by the one or more processors of the electronic device, cause the electronic device to:

wherein, while a browser application is installed on the electronic device:
determine whether an installer associated with the installed plugin is running while the browser application is closed.

16. The non-transitory computer-readable storage medium of claim 1, wherein the one or more programs further comprise instructions, which when executed by the one or more processors of the electronic device, cause the electronic device to:

wherein the installed plugin meets the disabling criteria, update the installed plugin in accordance with an automated update policy:
after update of the installed plugin, receive first data from a data source, the first data including an instruction to perform a function with the updated plugin;
in response to receipt of the first data from the data source:
forgo performance of the function with the installed plugin; and
report the plugin as uninstalled.

17. An electronic device, comprising:
a display;
a memory;
a processor coupled to the display and the memory; and
an installed plugin stored in the memory and executable by the processor such that the plugin is actually installed on the electronic device; the processor configured to:
receive first data from a data source, the first data associated with the installed plugin;
in response to receipt of the first data from the data source, determining if the installed plugin meets a disabling criteria;
in accordance with a determination that the installed plugin meets a disabling criteria:
forgo performance of a function with the installed plugin; and
report to the data source that the installed plugin is not installed on the electronic device, even when it is actually installed;
in accordance with a determination that the installed plugin does not meet the disabling criteria, perform the function with the installed plugin.

18. The electronic device of claim 17, wherein the first data is a query from the data source about a presence of the plugin.

19. The electronic device of claim 17, wherein the first data is an instruction to perform a function with the installed plugin.

20. The electronic device of claim 17, the processor further configured to:
after the report to the data source that the installed plugin is not installed on the electronic device, while a browser application is installed on the electronic device, receive second data different from the first data from the data source, the second data including an instruction to perform a second function incompatible with the installed plugin; and
perform the second function with the browser application.

21. The electronic device of claim 17, the processor further configured to:
after the report to the data source that the installed plugin is not installed on the electronic device, while a second plugin is installed on the electronic device, receive second data different from the first data from the data source, the second data including an instruction to perform a second function incompatible with the installed plugin; and
perform the second function with the second plugin.

22. The electronic device of claim 21, the processor further configured to:
wherein the second data includes the instruction to perform the second function with the second installed plugin distinct from the first installed plugin:
perform the second function with the second plugin.

23. The electronic device of claim 17, the processor further configured to:
wherein the installed plugin meets the disabling criteria:
receive from the data source instructions corresponding to a request to install the installed plugin on the electronic device;
in response to receipt of the instructions corresponding to a request to install the installed plugin on the electronic device, display an affordance for activating the installed plugin;
receive an input corresponding to selection of the affordance,
in response to receipt of the input corresponding to selection of the affordance, perform the function with the installed plugin.

24. The electronic device of claim 23, the processor further configured to:
after receipt of the input corresponding to selection of the affordance, enable performance of instructions to perform a function with the installed plugin that are received from the data source, while continuing to forgo performance of the function with the installed plugin for data from other data sources.

25. The electronic device of claim 17, wherein the installed plugin is a multimedia player.

26. The electronic device of claim 17, the processor further configured to:
wherein the installed plugin meets the disabling criteria:
install an updated version of the installed plugin;
in response to installation of the updated version of the installed plugin, alter the disabling criteria so that the installed plugin does not meet the disabling criteria.

27. The electronic device of claim 17, the processor further configured to:
receive input from a user identifying at least one plugin as meeting the disabling criteria.

28. The electronic device of claim 17, the processor further configured to:
wherein the installed plugin meets the disabling criteria:
receive user input corresponding to a request to alter the disabling criteria; and
in response to receipt of user input corresponding to a request to alter the disabling criteria, alter the disabling criteria.

29. The electronic device of claim 17, wherein the electronic device further comprises a browser application in which the installed plugin is installed, the processor further configured to:
close the browser application;
in response to closure of the browser application, store a version number of the installed plugin;
restart the browser application;
in response to the restart of the browser application; obtain the version number of the installed plugin;
determine whether the version number of the plugin stored in response to the closing differs from the version number of the plugin obtained in response to the restarting;
in accordance with a determination that the version of the plugin stored in response to the closure is different from the version of the plugin obtained in response to the restarting, determine that the installed plugin does not meet the disabling criteria;
in accordance with a determination that the version of the plugin stored in response to the closure is the same as the version of the plugin obtained in response to the restarting, determine that the installed plugin meets the disabling criteria.

30. The electronic device of claim 17, the processor further configured to:
determine whether an installer associated with the installed plugin is running;
responsive to a determination that an installer is running, determine whether the installer is running as root;
in accordance with a determination that the installer is not running as root, determine that the installed plugin does not meet the disabling criteria; and
in accordance with a determination that the installer is running as root, determine that the installed plugin meets the disabling criteria.

31. The electronic device of claim 30, the processor further configured to:
wherein, while a browser application is installed on the electronic device:
determine whether an installer associated with the installed plugin is running while the browser application is closed.

32. The electronic device of claim 17, the processor further configured to:
wherein the installed plugin meets the disabling criteria, update the installed plugin in accordance with an automated update policy:
after update of the installed plugin, receive first data from a data source, the first data including an instruction to perform a function with the updated plugin;
in response to receipt of the first data from the data source:
forgo performance of the function with the installed plugin; and
report the plugin as uninstalled.

33. A method, comprising:
at an electronic device with a display:
while a plugin is actually installed on the electronic device, receiving first data from a data source, the first data associated with the installed plugin;
in response to receiving the first data from the data source while the plugin is installed on the electronic device, determining if the installed plugin meets a disabling criteria;
in accordance with a determination that the installed plugin meets a disabling criteria:
forgoing performance of a function with the installed plugin; and
reporting to the data source that the installed plugin is not installed on the electronic device, even when it is actually installed;
in accordance with a determination that the installed plugin does not meet the disabling criteria, performing a function with the installed plugin.

34. The method of claim 33, wherein the first data is a query from the data source about a presence of the plugin.

35. The method of claim 33, wherein the first data is an instruction to perform a function with the installed plugin.

36. The method of claim 33, further comprising:
after the report to the data source that the installed plugin is not installed on the electronic device, while a browser application is installed on the electronic device, receiving second data different from the first data from the data source, the second data including an instruction to perform a second function incompatible with the installed plugin; and
performing the second function with the browser application.

37. The method of claim 33, further comprising:
after the report to the data source that the installed plugin is not installed on the electronic device, while a second plugin is installed on the electronic device, receiving second data different from the first data from the data source, the second data including an instruction to perform a second function incompatible with the installed plugin; and
performing the second function with the second plugin.

38. The method of claim 37, further comprising:
wherein the second data includes the instruction to perform the second function with the second installed plugin distinct from the first installed plugin:
performing the second function with the second plugin.

39. The method of claim 33, further comprising:
wherein the installed plugin meets the disabling criteria:
receiving from the data source instructions corresponding to a request to install the installed plugin on the electronic device;
in response to receipt of the instructions corresponding to a request to install the installed plugin on the electronic device, displaying an affordance for activating the installed plugin;
receiving an input corresponding to selection of the affordance,
in response to receipt of the input corresponding to selection of the affordance, performing the function with the installed plugin.

40. The method of claim 39, further comprising:
after receipt of the input corresponding to selection of the affordance, enabling performance of instructions to perform a function with the installed plugin that are received from the data source, while continuing to forgo performance of the function with the installed plugin for data from other data sources.

41. The method of claim 33, wherein the installed plugin is a multimedia player.

42. The method of claim 33, further comprising:
wherein the installed plugin meets the disabling criteria:
installing an updated version of the installed plugin;
in response to installation of the updated version of the installed plugin, altering the disabling criteria so that the installed plugin does not meet the disabling criteria.

43. The method of claim 33, further comprising:
receiving input from a user identifying at least one plugin as meeting the disabling criteria.

44. The method of claim 33, further comprising:
wherein the installed plugin meets the disabling criteria:
receiving user input corresponding to a request to alter the disabling criteria; and
in response to receipt of user input corresponding to a request to alter the disabling criteria, altering the disabling criteria.

45. The method of claim 33, wherein the electronic device further comprises a browser application in which the installed plugin is installed, the method further comprising:
closing the browser application;
in response to closure of the browser application, storing a version number of the installed plugin;
restarting the browser application;
in response to the restart of the browser application; obtaining the version number of the installed plugin;
determining whether the version number of the plugin stored in response to the closing differs from the version number of the plugin obtained in response to the restarting;
in accordance with a determination that the version of the plugin stored in response to the closure is different from the version of the plugin obtained in response to the restarting, determining that the installed plugin does not meet the disabling criteria;
in accordance with a determination that the version of the plugin stored in response to the closure is the same as the version of the plugin obtained in response to the restarting, determining that the installed plugin meets the disabling criteria.

46. The method of claim 33, further comprising:
determining whether an installer associated with the installed plugin is running;
responsive to a determination that an installer is running, determining whether the installer is running as root;
in accordance with a determination that the installer is not running as root, determining that the installed plugin does not meet the disabling criteria; and
in accordance with a determination that the installer is running as root, determining that the installed plugin meets the disabling criteria.

47. The method of claim 46, further comprising:
wherein, while a browser application is installed on the electronic device:
determining whether an installer associated with the installed plugin is running while the browser application is closed.

48. The method of claim 33, further comprising:
wherein the installed plugin meets the disabling criteria, updating the installed plugin in accordance with an automated update policy:

after update of the installed plugin, receiving first data from a data source, the first data including an instruction to perform a function with the updated plugin;

in response to receipt of the first data from the data source:

forgoing performance of the function with the installed plugin; and reporting the plugin as uninstalled.

\* \* \* \* \*